US012696290B2

(12) United States Patent
Li

(10) Patent No.: US 12,696,290 B2
(45) Date of Patent: Jul. 28, 2026

(54) DOWNLINK CONTROL INFORMATION TRANSMISSION METHOD AND APPARATUS, AND COMMUNICATION DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 419 days.

(21) Appl. No.: 18/261,196

(22) PCT Filed: Jan. 13, 2021

(86) PCT No.: PCT/CN2021/071614
    § 371 (c)(1),
    (2) Date: Jul. 12, 2023

(87) PCT Pub. No.: WO2022/151108
    PCT Pub. Date: Jul. 21, 2022

(65) Prior Publication Data
    US 2024/0064766 A1    Feb. 22, 2024

(51) Int. Cl.
    *H04W 4/00*        (2018.01)
    *H04B 7/0408*     (2017.01)
    (Continued)

(52) U.S. Cl.
    CPC ........ *H04W 72/232* (2023.01); *H04B 7/0408* (2013.01); *H04L 5/0023* (2013.01); *H04L 5/0035* (2013.01)

(58) Field of Classification Search
    CPC ........... H04W 72/232; H04W 72/0446; H04W 88/08; H04W 72/0453; H04W 24/00;
    (Continued)

(56) References Cited

U.S. PATENT DOCUMENTS

2019/0230697 A1 *  7/2019  Yang ...................... H04L 1/1845
2020/0076487 A1 *  3/2020  Liu ...................... H04B 7/0695
    (Continued)

FOREIGN PATENT DOCUMENTS

CN        108023708 A      5/2018
CN        108633007 A     10/2018
    (Continued)

OTHER PUBLICATIONS

International Search Report issued Oct. 12, 2021 in PCT/CN2021/071614, filed on Jan. 13, 2021, citing documents 15-19 therein, 2 pages.
    (Continued)

*Primary Examiner* — Phuongchau Ba Nguyen
(74) *Attorney, Agent, or Firm* — Oblon, McClelland, Maier & Neustadt, L.L.P.

(57) ABSTRACT

The present disclosure relates to the technical field of wireless communications, and provides a method for transmitting downlink control information, a communication device, and a medium. The method can include receiving, through a first reception beam, first control information from a network device in a first time slot, and receiving, through a second reception beam, second control information from the network device in at least one second time slot. The first reception beam and the second reception beam correspond to a same Transmission Reception Point (TRP) or different TRPs, and the first control information and the second control information received in the at least one second time slot are first downlink control information of a plurality of repeated sendings by the network device, and decoding the first control information and/or the second control information to obtain the first downlink control information.

19 Claims, 4 Drawing Sheets

--- receiving, using a first reception beam, first control information from a network device in a first time slot, and receiving, using a second reception beam, second control information from the network device in at least one second time slot; wherein the first control information occupies a first frequency domain resource of a first SS set, and the second control information occupies a second frequency domain resource of a second SS set

301 decoding the first control information and/or the second control information to obtain the first downlink control information

302

(51) Int. Cl.
    *H04L 5/00*         (2006.01)
    *H04W 72/232*     (2023.01)

(58) Field of Classification Search
    CPC ... H04B 7/0408; H04L 5/0023; H04L 5/0035;
                  H04L 5/0053; H04L 1/1829; H04L
                         1/1845; H04L 5/0007
    See application file for complete search history.

(56)                References Cited

U.S. PATENT DOCUMENTS

2020/0328849 A1 * 10/2020 Noh ..................... H04L 1/1812
2021/0288696 A1 * 9/2021 Jung ................... H04B 7/0421
2022/0045806 A1 * 2/2022 Cirik ................... H04L 1/1887

FOREIGN PATENT DOCUMENTS

| | | | |
|---|---|---|---|
| CN | 109560904 | A | 4/2019 |
| CN | 110178429 | A | 8/2019 |
| WO | WO 2019/024556 | A1 | 2/2019 |
| WO | WO 2020/160692 | A1 | 8/2020 |

OTHER PUBLICATIONS

Chinese Office Action issued Jul. 8, 2022 in CN 202180000163.8, citing documents 15-17 & 20 therein, 5 pages.
Chinese Office Action issued Jan. 13, 2023 in CN 202180000163.8, citing documents 15-17 & 26 therein, 3 pages.
"Enhancements on Multi-TRP for PDCCH, PUCCH and PUSCH", Lenovo, Motorola Mobility, 3GPP TSG RAN WG1 #103-e, (R1-2008911), 2020, 15 pages.

* cited by examiner

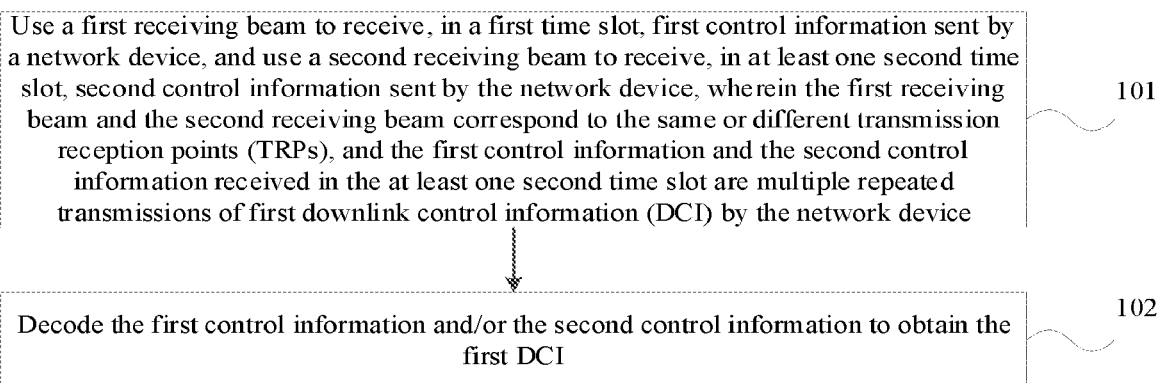

Use a first receiving beam to receive, in a first time slot, first control information sent by a network device, and use a second receiving beam to receive, in at least one second time slot, second control information sent by the network device, wherein the first receiving beam and the second receiving beam correspond to the same or different transmission reception points (TRPs), and the first control information and the second control information received in the at least one second time slot are multiple repeated transmissions of first downlink control information (DCI) by the network device

101

Decode the first control information and/or the second control information to obtain the first DCI

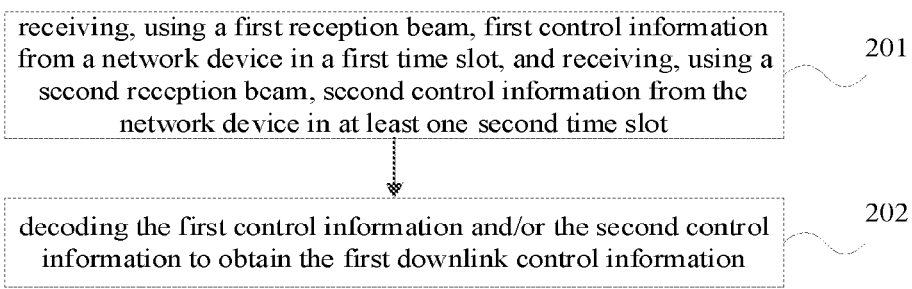

receiving, using a first reception beam, first control information from a network device in a first time slot, and receiving, using a second reception beam, second control information from the network device in at least one second time slot

201 decoding the first control information and/or the second control information to obtain the first downlink control information

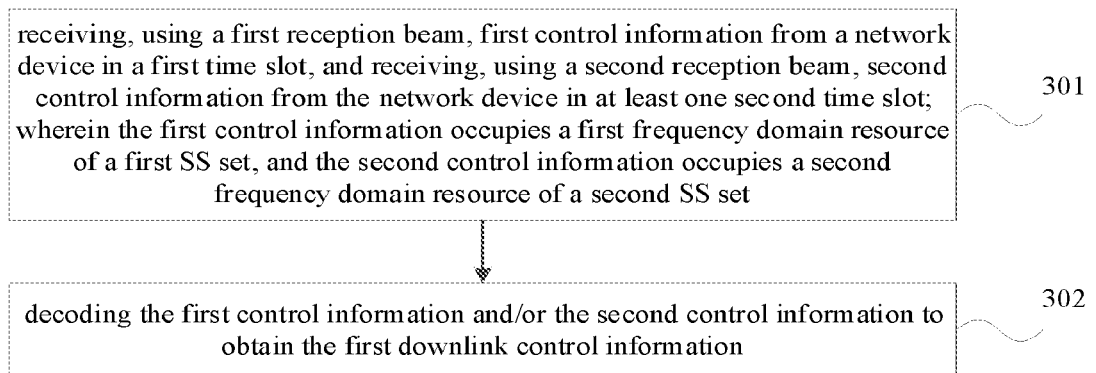

receiving, using a first reception beam, first control information from a network device in a first time slot, and receiving, using a second reception beam, second control information from the network device in at least one second time slot; wherein the first control information occupies a first frequency domain resource of a first SS set, and the second control information occupies a second frequency domain resource of a second SS set

301 decoding the first control information and/or the second control information to obtain the first downlink control information

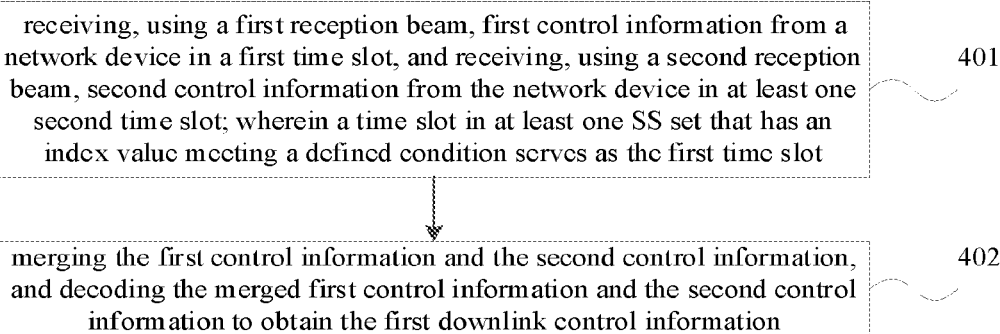

receiving, using a first reception beam, first control information from a network device in a first time slot, and receiving, using a second reception beam, second control information from the network device in at least one second time slot; wherein a time slot in at least one SS set that has an index value meeting a defined condition serves as the first time slot    401 merging the first control information and the second control information, and decoding the merged first control information and the second control information to obtain the first downlink control information    402

FIG. 4

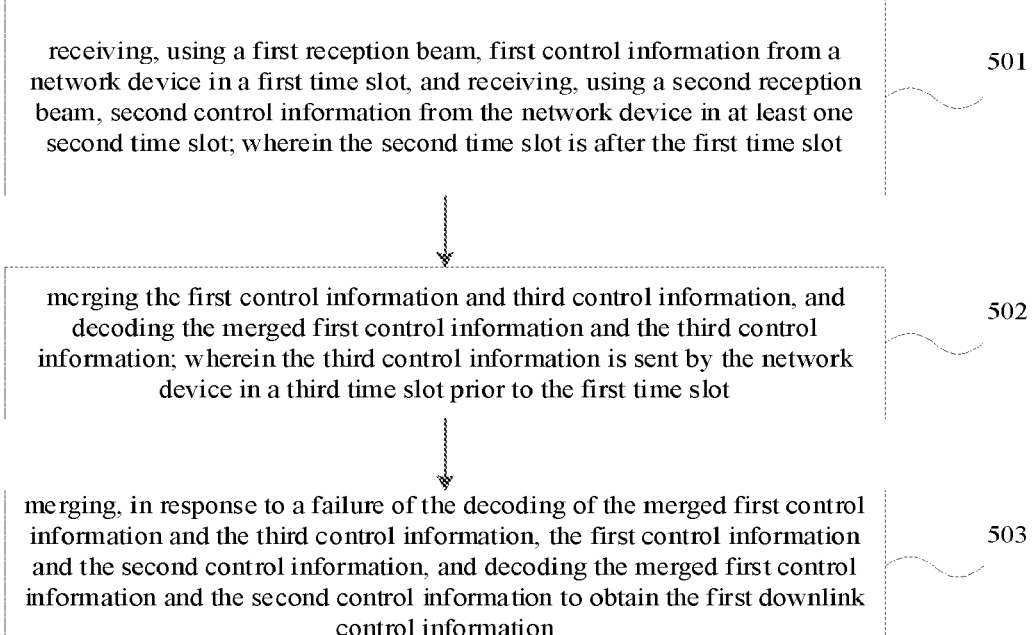

receiving, using a first reception beam, first control information from a network device in a first time slot, and receiving, using a second reception beam, second control information from the network device in at least one second time slot; wherein the second time slot is after the first time slot    501 merging the first control information and third control information, and decoding the merged first control information and the third control information; wherein the third control information is sent by the network device in a third time slot prior to the first time slot    502 merging, in response to a failure of the decoding of the merged first control information and the third control information, the first control information and the second control information, and decoding the merged first control information and the second control information to obtain the first downlink control information    503

FIG. 5 repeatedly sending first DCI to a terminal; wherein the first DCI of a plurality of repeated sendings includes first control information and second control information, the first control information is received by the terminal using a first reception beam in a first time slot, and the second control information is received by the terminal using a second reception beam in at least one second time slot; and the first reception beam and the second reception beam correspond to a same TRP or different TRPs; and the first control information and the second control information are configured for merging and decoding

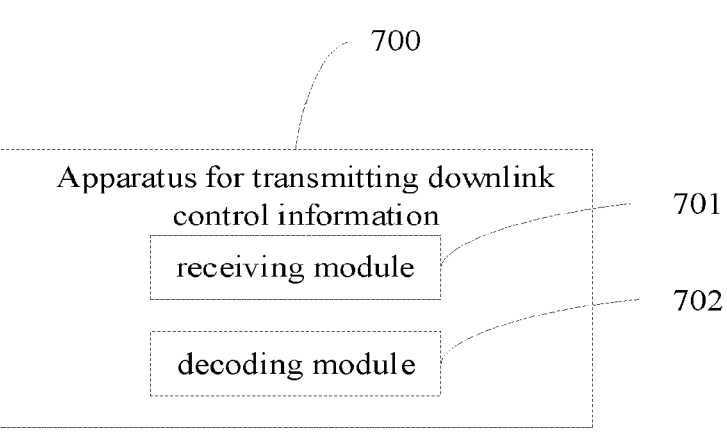

Apparatus for transmitting downlink control information

701 receiving module

702 decoding module

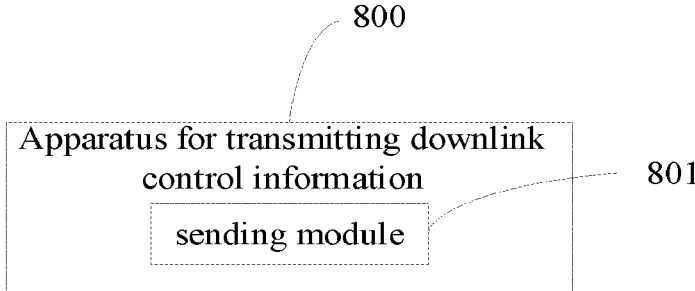

Apparatus for transmitting downlink control information

801 sending module

FIG. 8

DOWNLINK CONTROL INFORMATION TRANSMISSION METHOD AND APPARATUS, AND COMMUNICATION DEVICE

CROSS-REFERENCE TO RELATED APPLICATION

The present application is the U.S. National phase application of International Application No. PCT/CN2021/071614, filed on Jan. 13, 2021, the entire content of which is incorporated herein by reference for all purposes.

BACKGROUND

Technical Field

The present disclosure relates to the field of wireless communication technology, and in particular, to a method and apparatus for transmitting downlink control information, and a communication device.

Description of the Related Art

In New Radio (NR), i.e., a new wireless technology or new air interface, when the communication frequency band is particularly in frequency range 2, due to the fast fading of high-frequency channels, beam-based transmission and reception can be used to ensure the coverage of the signal. When a network device is provided with a plurality of Transmission Reception Points (TRPs), the network device may use the plurality of TRPs to provide services to the terminal, including using the plurality of TRPs to send Physical Downlink Control Channel (PDCCH) for the terminal.

The purpose of the above-mentioned using the plurality of TRPs by the network device to provide services to the terminal, is to improve the signal coverage. However, in practical application, the inventor found that the reliability of sending PDCCH by the network device cannot meet the requirements and needs to be further improved.

SUMMARY

According to embodiments of a first aspect of the present disclosure, a method for transmitting downlink control information is proposed, which is applied to a terminal, including receiving, using a first reception beam, first control information from a network device in a first time slot, and receiving, using a second reception beam, second control information from the network device in at least one second time slot. The first reception beam and the second reception beam correspond to a same Transmission Reception Point (TRP) or different TRPs, and the first control information and the second control information received in the at least one second time slot are first downlink control information of a plurality of repeated sendings by the network device; and decoding the first control information and/or the second control information to obtain the first downlink control information.

According to embodiments of a second aspect of the present disclosure, another method for transmitting downlink control information is proposed, which is applied to a network device, including repeatedly sending first downlink control information to a terminal; wherein the first downlink control information of a plurality of repeated sendings includes first control information and second control information, the first control information is received by the terminal using a first reception beam in a first time slot, and the second control information is received by the terminal using a second reception beam in at least one second time slot, and the first reception beam and the second reception beam correspond to a same TRP or different TRPs, and the first control information and/or the second control information is configured for decoding by the terminal.

According to embodiments of a third aspect of the present disclosure, a communication device is proposed, including a transceiver, a memory, and a processor connected to the transceiver and the memory, respectively, and configured to control a transmission and reception by the transceiver of a wireless signal by executing computer-executable instructions on the memory and to implement the method for transmitting the downlink control information proposed in the embodiments of the first aspect of the present disclosure, or to implement the method for transmitting the downlink control information proposed in the embodiments of the second aspect of the present disclosure.

According to embodiments of a fourth aspect of the present disclosure, a computer storage medium is proposed. The computer storage medium stores non-transitory computer-executable instructions, and the computer-executable instructions, when executed by a processor, cause the processor to implement the method for transmitting the downlink control information proposed in the embodiments of the first aspect of the present disclosure, or, to implement the method for transmitting the downlink control information proposed in the embodiments of the second aspect of the present disclosure.

According to embodiments of a fifth aspect of the present disclosure, a computer program product is proposed, including a computer program which, when executed by a processor, cause the processor to implement the method for transmitting the downlink control information proposed in the embodiments of the first aspect of the present disclosure, or, to implement the method for transmitting the downlink control information proposed in the embodiments of the second aspect of the present disclosure.

Additional aspects and advantages of the present disclosure will be described in part in the following description, some of which will become apparent from the following description, or will be learned through the practice of the present disclosure.

BRIEF DESCRIPTION OF THE DRAWINGS

The foregoing and/or additional aspects and advantages of the present disclosure will become apparent and easily understood from the following description of embodiments in conjunction with the accompanying drawings.

FIG. 1 is a flow diagram of a method for transmitting downlink control information provided by embodiments of the present disclosure.

FIG. 2 is a flow diagram of another method for transmitting downlink control information provided by embodiments of the present disclosure.

FIG. 3 is a flow diagram of yet another method for transmitting downlink control information provided by embodiments of the present disclosure.

FIG. 4 is a flow diagram of yet another method for transmitting downlink control information provided by embodiments of the present disclosure.

FIG. 5 is a flow diagram of yet another method for transmitting downlink control information provided by embodiments of the present disclosure.

FIG. 6 is a flow diagram of yet another method for transmitting downlink control information provided by embodiments of the present disclosure.

FIG. 7 is a schematic diagram of a structure of an apparatus for transmitting downlink control information provided by embodiments of the present disclosure.

FIG. 8 is a schematic diagram of a structure of another apparatus for transmitting downlink control information provided by embodiments of the present disclosure.

DETAILED DESCRIPTION OF THE PREFERRED EMBODIMENTS

Figure 9:
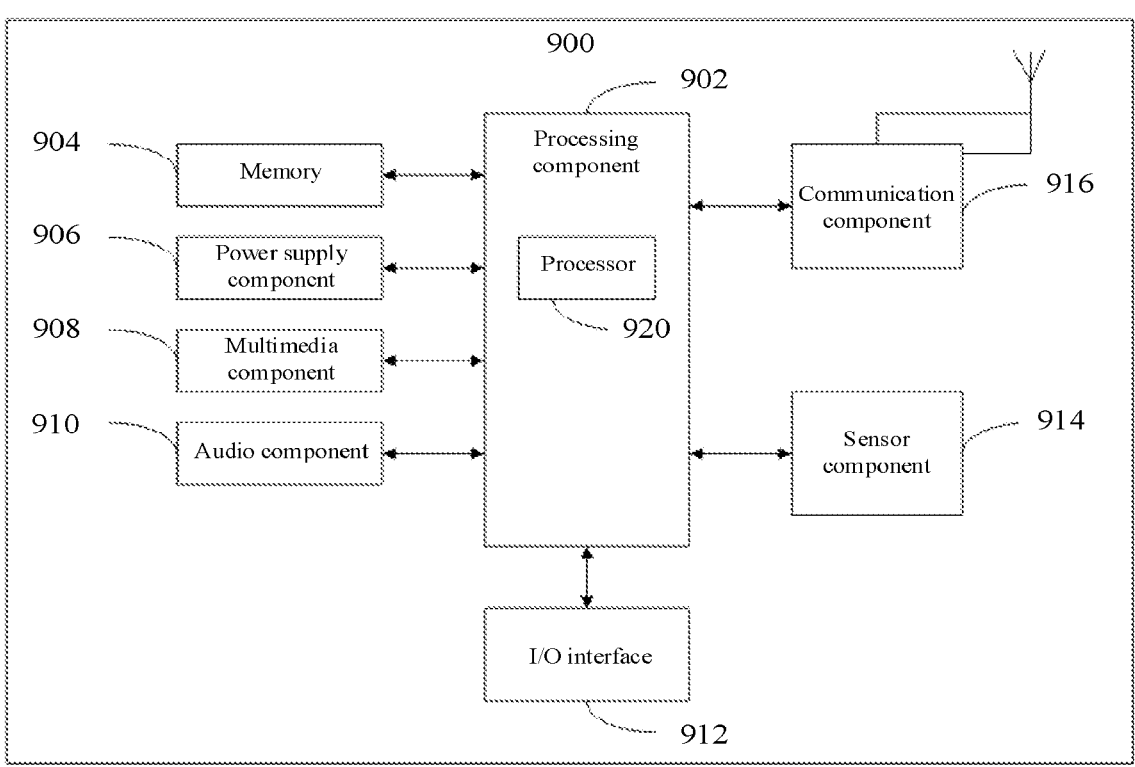
FIG. 9 is a block diagram of a terminal provided by embodiments of the present disclosure.

Exemplary embodiments will be described herein in detail, examples of which are represented in the accompanying drawings. When the following description relates to the accompanying drawings, the same numerals in different accompanying drawings indicate the same or similar elements unless otherwise indicated. The implementations described in the following exemplary embodiments do not represent all embodiments that are consistent with the present disclosure. Rather, they are only examples of devices and methods that are consistent with some aspects of the present disclosure, as detailed in the appended claims.

The terms used in embodiments of the present disclosure are intended to describe particular embodiments only, and are not intended to limit embodiments of the present disclosure. The singular forms of "a/an" and "this" as used in the embodiments of the present disclosure and the appended claims are also intended to include plural forms unless the context clearly indicates otherwise. It should also be understood that the term "and/or" as used herein refers to and encompasses any or all possible combinations of one or more of the associated listed items.

It should be understood that although the terms "first", "second", and "third", etc. may be used in the embodiments of the present disclosure to describe various kinds of information, the information should not be limited by these terms. These terms are used only to distinguish the same type of information from one another. For example, without departing from the scope of embodiments of the present disclosure, first information may also be referred to as second information, and similarly, second information may also be referred to as first information, depending on the context. For example, the word "if" as used herein may be interpreted as "at the time of . . . ", or "when . . . ", or "in response to determining . . . ".

Embodiments of the present disclosure are described in detail below, and examples of the embodiments are illustrated in the accompanying drawings, in which the same or similar signs throughout indicate the same or similar elements. The embodiments described below by reference to the accompanying drawings are exemplary and are intended to be used to explain the present disclosure and are not to be construed as limiting the present disclosure.

In NR, when the communication frequency band is particularly in frequency range 2, due to the fast fading of high-frequency channels, beam-based transmission and reception can be used to ensure the coverage of the signal. When a network device is provided with a plurality of TRPs, the network device may use the plurality of TRPs to provide services to the terminal, including using the plurality of TRPs to send PDCCH for the terminal. That is, a Control Resource Set (CORESET) for PDCCH configured by the network device for the terminal, may be used for PDCCH transmission of TRP #0, or may be used for PDCCH transmission of TRP #1, or may be used for PDCCH transmission of TRP #0 and TRP #1.

In the embodiments of the present disclosure, a TRP refers to an antenna array that supports multiple transmit or receive functions and may, for example, have multiple antennas with different orientations. Different TRPs may refer to antenna arrays located at different geographic locations.

In order to improve the reliability of PDCCH transmission, in one embodiment of the present disclosure, the network device can use different TRPs to send the same Downlink Control Information (DCI) signaling for the terminal based on different beam states (indicated by Transmission Configuration Indication (TCI)) or SpatialRelationInfo indicating Reference Signal (RS), i.e., indicating the beam direction.

The TCI state identifier indicates a reference signal resource identifier, which can be a Synchronization Signal Block (SSB) identifier, or a Channel State Information Reference Signal (CSI-RS) identifier, or a Sounding Reference Signal (SRS) identifier. The TCI state identifier is used to instruct the terminal to receive a PDCCH or Physical Downlink Shared Channel (PDSCH) using a reception beam same as the one used to receive a certain SSB or CSI-RS sent by the network device. Here, a certain SSB or CSI-RS is the SSB or CSI-RS corresponding to the reference signal resource identifier corresponding to the TCI state identifier. Alternatively, the TCI state identifier is used to instruct the terminal to send a Physical Uplink Control Channel (PUCCH) or Physical Uplink Shared Channel (PUSCH) using a transmission beam same as the one used to send a certain reference signal (e.g. SRS) or using a transmission beam corresponding to a reception beam same as the one used to receive a certain reference signal (e.g. SSB or CSI-RS).

In conventional methods, each CORESET can only support the configuration of one TCI state, and each Search Space (SS) set can only support the association of one CORESET. In an embodiment of the present disclosure, the sending of PDCCHs that supports multiple TRPs can be achieved by following methods.

Method 1: One CORESET is configured with two TCI states.

Method 2: One SS set is associated with two CORESETs.

Method 3: Two SS sets are configured to be associated with different CORESETs, respectively.

In an embodiment of the present disclosure, a network device can send a same DCI signaling repeatedly in different time slots using two TRPs. However, for a terminal, how to determine the DCI signaling of which two time slots is the same DCI signaling sent by the network device, is a problem that needs to be solved.

In view of the above problems, the present disclosure provides a method and apparatus for transmitting downlink control information and a communication device.

FIG. 1 is a flow diagram of a method for transmitting downlink control information as provided in embodiments of the present disclosure. The method for transmitting the downlink control information can be applied in a terminal.

The terminal may be a device that provides voice and/or data connectivity to a user, a handheld device with wireless connectivity functions, or other processing device connected to a wireless modem, etc. The name of the terminal may also vary in different systems, for example, the terminal may be called User Equipment (UE) in a 5G system. A wireless terminal device may communicate with one or more Core Network (CNs) via a Radio Access Network (RAN), and the wireless terminal device may be a mobile terminal device, such as a cell phone (or "cellular" phone) and a computer with a mobile terminal device. For example, it may be portable, pocket-sized, handheld, computer-built, or vehicle-mounted mobile devices that exchange language and/or data with the radio access network.

For example, the terminal may be a Personal Communication Service (PCS) phone, cordless phone, Session Initiated Protocol (SIP) phone, Wireless Local Loop (WLL) station, Personal Digital Assistant (PDA) and other devices. The wireless terminal device may also be called a system, subscriber unit, subscriber station, mobile station, mobile, remote station, access point, remote terminal, access terminal, user terminal, user agent, and user device, without limitation in embodiments of the present disclosure.

As shown in FIG. 1, the method for transmitting the downlink control information may include the following steps.

Step 101, receiving, using a first reception beam, first control information from a network device in a first time slot, and receiving, using a second reception beam, second control information from the network device in at least one second time slot. The first reception beam and the second reception beam correspond to a same TRP or different TRPs, and the first control information and the second control information received in the at least one second time slot are first downlink control information of a plurality of repeated sendings by the network device.

In this embodiment of the present disclosure, taking the network device as a base station for example, the base station may include a plurality of cells that provide services to the terminal. Depending on the specific application, each cell may include a plurality of Transmission Reception Points (TRPs), which may be devices in the access network that communicate with wireless terminal devices over one or more sectors via the air interface, or called by other names. For example, the base station involved in embodiments of the present disclosure may be a Base Transceiver Station (BTS) in Global System for Mobile communications (GSM) or in Code Division Multiple Access (CDMA), or a base station (NodeB) in Wide-band Code Division Multiple Access (WCDMA), or an evolutional Node B (eNB or e-NodeB) in long term evolution (LTE) system, or 5G base station (gNB) in 5G network architecture (i.e., next generation system), or Home evolved Node B (HeNB), relay node, femto cell, pico cell, etc., which are not limited in the embodiments of the present disclosure.

In this embodiment of the present disclosure, the network device may send the first DCI to the terminal device repeatedly. The first DCI of a plurality of repeated sendings may include the first control information and the second control information, and accordingly, the terminal may receive the first control information from the network device in the first time slot using the first reception beam, and the second control information from the network device in the at least one second time slot using the second reception beam.

The first reception beam and the second reception beam may correspond to the same TRP, or the first reception beam and the second reception beam may correspond to different TRPs. For example, the first reception beam corresponds to TRP #0 and the second reception beam corresponds to TRP #1. The different TRPs may correspond to the same service cell or different service cells of the terminal, or some of the TRPs correspond to the service cell(s) of the terminal and some of the TRPs correspond to the neighboring cell(s) of the terminal, which is not limited by the present disclosure.

The first control information and the second control information received in each second time slot are used to carry the same downlink control information DCI, i.e., the first control information and the second control information received in each second time slot are first DCI sent repeatedly by the network device multiple times.

Here, the first time slot and the second time slot are different time slots.

Here, the first time slot and the second time slot may be consecutive time slots, for example, the first time slot is "0" and the second time slot is "1". Alternatively, the first time slot and the second time slot may be non-consecutive time slots, for example, the first time slot is "0" and the second time slot is "3". This is not limited by the embodiments of the present disclosure.

Step 102, decoding the first control information and/or the second control information to obtain the first downlink control information.

In this embodiment of the present disclosure, the terminal, after receiving the first control information and the second control information, may decode the first control information independently, or may decode the second control information independently, or may merge the first control information and the second control information and decode the merged first control information and the second control information to obtain the first DCI. The decoding method may include at least one of: decoding the first control information independently, decoding the second control information independently, and decoding the merged first control information and the second control information. Decoding the second control information independently includes that when one piece of second control information is sent in one time slot, the one piece of second control information is decoded independently, and further includes that when multiple pieces of second control information are sent in multiple time slots, decoding is performed independently for each piece of second control information and decoding is performed for at least any two pieces of merged second control information of the multiple pieces of second control information. Thus, the network device uses multiple beams to repeatedly send the same DCI in the corresponding multiple time slots, thereby facilitating the terminal to receive and decode above DCI and improving the reliability of downlink transmission.

In this case, the downlink transmission can be a mixed transmission of signaling, data, and both signaling and data.

In the method for transmitting the downlink control information of the embodiments of the present disclosure, the terminal receives the first control information from the network device using the first reception beam in the first time slot, and the second control information from the network device using the second reception beam in at least one second time slot, wherein the first reception beam and the second reception beam correspond to the same or different TRPs, and the first control information and the second control information received in the at least one second time slot are the first downlink control information of a plurality of repeated sendings by the network device, and the terminal decodes the first control information and/or the second control information to obtain the first downlink control information. As a result, the network device uses multiple beams to send the same DCI repeatedly in the corresponding multiple time slots, which can facilitate the terminal to receive and decode the above DCI and improve the reliability of downlink transmission.

In the embodiments of the present disclosure, another method for transmitting downlink control information is provided. FIG. 2 is a flow diagram of another method for transmitting downlink control information provided by embodiments of the present disclosure. The method for transmitting the downlink control information can be applied in a terminal.

As shown in FIG. 2, the method for transmitting the downlink control information may include the following steps.

Step 201, receiving, using a first reception beam, first control information from a network device in a first time slot, and receiving, using a second reception beam, second control information from the network device in at least one second time slot.

In this embodiment of the present disclosure, the first reception beam and the second reception beam may correspond to the same TRP, or the first reception beam and the second reception beam may correspond to different TRPs. For example, the first reception beam corresponds to TRP #0 and the second reception beam corresponds to TRP #1. The different TRPs may correspond to the same service cell or different service cells of the terminal, or some of the TRPs correspond to the service cell(s) of the terminal and some of the TRPs correspond to the neighboring cell(s) of the terminal, which is not limited by the present disclosure.

In this embodiment of the present disclosure, the first control information and the second control information received in at least one second time slot above are used to carry the same DCI, i.e., the first control information and the second control information received in each second time slot are first DCI of a plurality of repeated sendings by the network device.

In this embodiment of the present disclosure, the first time slot is used for a first sending in the plurality of repeated sendings, and the at least one second time slot above is used for one or more sendings after the first sending in the plurality of repeated sendings.

Optionally, the first time slot belongs to a first SS set and at least one second time slot above belongs to a second SS set. The first SS set may be used for the first sending in the plurality of repeated sendings, for example, the first SS set may be used for the first sending in the plurality of repeated sendings of the first DCI or, alternatively, may be used for the first sending in the plurality of repeated sendings of DCI other than the first DCI. The second SS set may be used for one or more sendings after the first sending in the plurality of repeated sendings, for example, the second SS set may be used for one or more sendings after the first sending in the plurality of repeated sendings of the first DCI, or, alternatively, it may be used for one or more sendings after the first sending in the plurality of repeated sendings of other DCIs.

Here, the time slots corresponding to the first SS set and the second SS set are different. The time slots used to send DCI in the first SS set and the second SS set appear periodically, for example, the period for the first SS set is 2 slots, and the index values of the time slots corresponding to the first SS set may be 0, 2, 4, . . . ; and the period for the second SS set is also 2 slots, and the index values of the time slots corresponding to the second SS set may be 1, 3, 5, . . . .

Taking the example that the first SS set indicated by the network device is SS set #1 and the second SS set is SS set #2, the period for SS set #1 is 2 slots, the index values of the time slots corresponding to SS set #1 may be 0, 2, 4, . . . and the period for SS set #2 is also 2 slots, and the index values of the time slots corresponding to SS set #2 may be 1, 3, 5 . . . . The network device can instruct by sending an indication signaling the terminal that the first DCI is sent for the first time in the slot of SS set #1 (noted as the first time slot in this disclosure), and that the first DCI is sent for the second time in the slot of SS set #2 that first appears after the first time slot. Accordingly, for the terminal, the DCI sent in slot #0 and slot #1 is the same, and the DCI sent in slot #2 and slot #3 is the same.

The above is an example in which the number of second time slot(s) is one and the second time slot is the first one arrived after the first time slot and corresponds to SS set #2.

Taking the example that the first SS set indicated by the network device is SS set #2 and the second SS set is SS set #1, the period for SS set #1 is 2 slots, and the index values of the time slots corresponding to SS set #1 may be 0, 2, 4, . . . and the period for SS set #2 is also 2 slots, and the index values of the time slots corresponding to SS set #2 may be 1, 3, 5, . . . . The network device can instruct by sending an indication signaling the terminal that the first DCI is sent for the first time in the slot of SS set #2 (noted as the first time slot in this disclosure), and that the first DCI is sent for the second time in the slot of SS set #1 that first appears after the first time slot. Accordingly, for the terminal, the DCI sent in slot #1 and slot #2 is the same, and the DCI sent in slot #3 and slot #4 is the same.

The above is an example in which the number of second time slot(s) is one and the second time slot is the first one arrived after the first time slot and corresponds to SS set #1.

It should be noted that the above is exemplified only by sending the indication signaling through the network device to indicate the terminal the first time slot in the first SS set used for the first sending, and the second time slot may be the first one arrived after the first time slot and correspond the second SS set. In practical application, the indication signaling can also be written into the standard and into the chip of the terminal, i.e., the default method. That is, in this disclosure, the first SS set can be preset, or, the first SS set can also be configured by the network device.

In this embodiment of the present disclosure, the first SS set and the second SS set may be associated with the same CORESET, or the first SS set and the second SS set may also be associated with different CORESETs. For example, the first SS set is associated with CORESET #1 and the second SS set is associated with CORESET #2. The first SS set and the second SS set correspond to different TCI states, e.g., the first SS set corresponds to TCI #1 and the second SS set corresponds to TCI #2.

Step 202, decoding the first control information and/or the second control information to obtain the first downlink control information.

In this embodiment of the present disclosure, the terminal may decode the first control information belonging to the same DCI independently, or may decode the second control information independently, or may merge the first control information and the second control information and decode the merged first control information and the second control information to obtain the first DCI. The decoding method may include at least one of: decoding the first control information independently, decoding the second control information independently, and decoding the merged first control information and the second control information. Decoding the second control information independently includes that when one piece of second control information is sent in one time slot, the one piece of second control information is decoded independently, and further includes that when multiple pieces of second control information are sent in multiple time slots, decoding is performed independently for each piece of second control information and decoding is performed for at least any two pieces of merged second control information of the multiple pieces of second control information. Thus, the terminal can receive the same DCI repeatedly sent in multiple time slots based on the resources of multiple time slots for sending the same DCI, which improves the decoding success rate of the DCI signaling.

In the method for transmitting the downlink control information of the embodiments of the present disclosure, the terminal receives the first control information from the network device using the first reception beam in the first time slot, and the second control information from the network device using the second reception beam in at least one second time slot, wherein the first reception beam and the second reception beam correspond to the same or different TRPs, and the first control information and the second control information received in the at least one second time slot are the first downlink control information of a plurality of repeated sendings by the network device; and the terminal decodes the first control information and/or the second control information to obtain the first downlink control information. As a result, the network device uses multiple beams to send the same DCI repeatedly in the corresponding multiple time slots, which can facilitate the terminal to receive and decode the above DCI and improve the reliability of downlink transmission.

In the embodiments of the present disclosure, another method for transmitting downlink control information is provided. FIG. 3 is a flow diagram of another method for transmitting downlink control information provided by embodiments of the present disclosure. The method for transmitting the downlink control information can be applied in a terminal.

As shown in FIG. 3, the method for transmitting the downlink control information may include the following steps.

Step 301, receiving, using a first reception beam, first control information from a network device in a first time slot, and receiving, using a second reception beam, second control information from the network device in at least one second time slot; wherein the first control information occupies a first frequency domain resource of a first SS set, and the second control information occupies a second frequency domain resource of a second SS set.

In this embodiment of the present disclosure, the first reception beam and the second reception beam may correspond to the same TRP, or the first reception beam and the second reception beam may correspond to different TRPs. For example, the first reception beam corresponds to TRP #0 and the second reception beam corresponds to TRP #1. The different TRPs may correspond to the same service cell or different service cells of the terminal, or some of the TRPs correspond to the service cell(s) of the terminal and some of the TRPs correspond to the neighboring cell(s) of the terminal, which is not limited by the present disclosure.

In this embodiment of the present disclosure, the first control information and the second control information received in each second time slot are used to carry the same DCI, i.e., the first control information and the second control information received in each second time slot are first DCI of a plurality of repeated sendings by the network device.

In this embodiment of the present disclosure, the first frequency domain resource is among one or more frequency domain resources corresponding to the first SS set, and is used for a first sending in a plurality of repeated sendings; and the second frequency domain resource is among one or more frequency domain resources corresponding to the second SS set, and is used for one or more sendings after the first sending in the plurality of repeated sendings.

In this embodiment of the present disclosure, the first time slot can be used for the first sending in the plurality repeated sendings, the first time slot belongs to the first SS set, and the first SS set can be used for the first sending in the plurality repeated sendings; at least one second time slot above can be used for one or more sendings after the first sending in the plurality of repeated sendings, the second time slot belongs to the second SS set, and the second SS set can be used for one or more sendings after the first sending in the plurality of repeated sendings. The network device may use the first frequency domain resource among the frequency domain resource(s) corresponding to the first SS set to send the first control information in the first time slot, and, use the second frequency domain resource among the frequency domain resource(s) corresponding to the second SS set to send the second control information in the second time slot. Accordingly, the terminal may use the first reception beam to receive the first control information from the network device in the first time slot, and use the second reception beam to receive the second control information from the network device in at least one second time slot.

Optionally, the first SS set and the second SS set may be the same SS set, and in this case, the first frequency domain resource and the second frequency domain resource are different frequency domain resources. For example, if the first SS set and the second SS set are SS set #1 and the SS set #1 has 16 Physical Downlink Control Channel (PDCCH) candidates, the first frequency domain resource may be the frequency domain resource corresponding to the PDCCH candidates indexed from 0 to 7, and the second frequency domain resource may be the frequency domain resource corresponding to the PDCCH candidates indexed from 8 to 15.

Optionally, the first SS set and the second SS set may be different SS sets, for example, the first SS set is SS set #1 and the second SS set is SS set #2, which is not limited by the present disclosure.

In a possible implementation of an embodiment of the present disclosure, the first time slot may also be used for one or more sendings after the first sending of the repeated sendings, specifically, the first SS set and the second SS set are different SS sets, and the frequency domain resource(s) corresponding to the first SS set may further include a third frequency domain resource, wherein the third frequency domain resource is used for one or more sendings after the first sending of the repeated sendings in the first time slot.

Optionally, the third frequency domain resource may be used to perform one or more sendings after the first sending of the plurality of repeated sendings of a DCI other than the first DCI in the first time slot. For example, the third frequency domain resource may be used to perform one or more sendings after the first sending of the plurality of repeated sendings of a second DCI in the first time slot, wherein the second DCI is different from the first DCI.

For example, if the first SS set has 16 PDCCH candidates, the first frequency domain resource may be the frequency domain resource corresponding to the PDCCH candidates indexed from 0 to 7, and the third frequency domain resource may be the frequency domain resource corresponding to the PDCCH candidates indexed from 8 to 15.

In a possible implementation of an embodiment of the present disclosure, the second time slot may also be used for the first sending of the repeated sendings, specifically, the first SS set and the second SS set are different SS sets, and the frequency domain resource(s) corresponding to the second SS set may further include a fourth frequency domain resource, wherein the fourth frequency domain resource is used for the first sending of the plurality of repeated sendings in the second time slot.

Optionally, the fourth frequency domain resource may be used to perform the first sending of the plurality of repeated sendings of a DCI other than the first DCI in the second time slot. For example, the fourth frequency domain resource may be used to perform the first sending of the plurality of repeated sendings of the second DCI in the second time slot, wherein the second DCI is different from the first DCI.

For example, if the second SS set has 16 PDCCH candidates, the fourth frequency domain resource may be the frequency domain resource corresponding to the PDCCH candidates indexed from 0 to 7, and the second frequency domain resource may be the frequency domain resource corresponding to the PDCCH candidates indexed from 8 to 15.

That is, the time slots in both the first SS set and the second SS set can be used for the first sending of a DCI, and if the first SS set and the second SS set are not distinguished, the terminal will not be able to determine which SS set is used for the first sending of a plurality of repeated sendings and which SS set is used for one or more sendings after the first sending of the plurality of repeated sendings. In this case, the terminal may merge and decode the control information that does not belong to the same DCI, which leads to the occurrence of decoding errors and reduces the success rate of DCI reception. Therefore, in order to solve the above problem, in the embodiments of the present disclosure, the first sending or one or more sendings after the first sending of the plurality of repeated sendings can be distinguished in the frequency domain.

For example, for the first SS set, the first SS set may contain multiple PDCCH candidates, e.g., M PDCCH candidates, then it can be specified that M/2 of them are used for the first sending and the other M/2 are used for the second sending. In this case, the PDCCH candidate indexes for the first sending and the second sending may be comb-shaped in the frequency domain, i.e., PDCCH candidate indexes of 0, 2, 4, . . . , M−2, can be used for the first sending, and PDCCH candidate indexes of 1, 3, 5, . . . , M−1, can be used for the second sending. Alternatively, the PDCCH candidate indexes for the first sending and the second sending may be consecutive, i.e., PDCCH candidate indexes of 0, 1, 2, 3, . . . , (M/2)−1, can be used for the first sending, and PDCCH candidate indexes of M/2, (M/2)+1, (M/2)+2, . . . , M−1, can be used for the second sending.

For example, for the second SS set, the second SS set may contain multiple PDCCH candidates, e.g., M PDCCH candidates, then it can be specified that M/2 of them are used for the second sending and the other M/2 are used for the first sending. In this case, the PDCCH candidate indexes for the second sending and the first sending may be comb-shaped in the frequency domain, i.e., PDCCH candidate indexes of 0, 2, 4, . . . , M−2, can be used for the second sending, and PDCCH candidate indexes of 1, 3, 5, . . . , M−1, can be used for the first sending. Alternatively, the PDCCH candidate indexes for the second sending and the first sending may be consecutive, i.e., PDCCH candidate indexes of 0, 1, 2, 3, . . . , (M/2)−1, can be used for the second sending, and PDCCH candidate indexes of M/2, (M/2)+1, (M/2)+2, . . . , M−1, can be used for the first sending of the second DCI.

Optionally, the first SS set and the second SS set are different SS sets, and an association exists between the first frequency domain resource and the second frequency domain resource. The association may include an association relationship between an index of a PDCCH candidate in the first frequency domain resource and an index of a PDCCH candidate in the second frequency domain resource. For example, the index of the PDCCH candidate of the first SS set is i and the index of the PDCCH candidate of the second SS set is i+j, which are used for sending the same DCI. The association relationship may be sent to the terminal by the network device through control signaling such as RRC signaling, MAC signaling, DCI signaling, etc., or it may be pre-configured for the terminal according to a communication protocol specified by a communication standardization organization (e.g., 3GPP communication organization), or it may have been configured when the terminal leaves the factory, without limitation here.

Optionally, the third frequency domain resource or the fourth frequency domain resource may be used for at least one sending of the plurality of repeated sendings of the second DCI, wherein the second DCI is different from the first DCI.

For example, in the first SS set, the PDCCH candidate indexes of 0, 2, 4, . . . , can be used for the first sending of the first DCI, and the PDCCH candidate indexes of 1, 3, 5, . . . , can be used for the second sending of the second DCI; and in the second SS set, the PDCCH candidate indexes of 0, 2, 4, . . . , can be used for the second sending of the first DCI, and the PDCCH candidate indexes of 1, 3, 5, . . . , can be used for the first sending of the second DCI.

The frequency domain resources corresponding to the first SS set and the second SS set may be the same or different, where the frequency domain resources here refer to the absolute positions of the frequency domain, not the PDCCH candidate index. That is, the first frequency domain resource and the second frequency domain resource may be the same or different, the first frequency domain resource and the fourth frequency domain resource may be the same or different, and the second frequency domain resource and the third frequency domain resource may be the same or different.

Step 302, decoding the first control information and/or the second control information to obtain the first downlink control information.

In this embodiment of the present disclosure, step 302 may be implemented in any one of the embodiments of the present disclosure, which is not limited in this embodiment of the present disclosure and will not be repeated.

In the method for transmitting the downlink control information of the embodiments of the present disclosure, the terminal receives the first control information from the network device using the first reception beam in the first time slot, and the second control information from the network device using the second reception beam in at least one second time slot, wherein the first reception beam and the second reception beam correspond to the same or different TRPs, and the first control information and the second control information received in each second time slot are the first downlink control information of a plurality of repeated sendings by the network device; and the terminal decodes the first control information and/or the second control information to obtain the first downlink control information. As a result, the network device uses multiple beams to send the same DCI repeatedly in the corresponding multiple time slots, which can facilitate the terminal to receive and decode the above DCI and improve the reliability of downlink transmission.

In the embodiments of the present disclosure, another method for transmitting downlink control information is provided. FIG. 4 is a flow diagram of another method for transmitting downlink control information provided by embodiments of the present disclosure. The method for transmitting the downlink control information can be applied in a terminal.

As shown in FIG. 4, the method for transmitting the downlink control information may include the following steps.

Step 401, receiving, using a first reception beam, first control information from a network device in a first time slot, and receiving, using a second reception beam, second control information from the network device in at least one second time slot; wherein a time slot in at least one SS set that has an index value meeting a defined condition serves as the first time slot.

In this embodiment of the present disclosure, the defined condition may include at least one of: the index value is an odd number or an even number; the index value is an integer multiple of a first value; and a remainder of the index value divided by a second value matches a third value.

In this embodiment of the present disclosure, the first reception beam and the second reception beam may correspond to the same TRP, or the first reception beam and the second reception beam may correspond to different TRPs. For example, the first reception beam corresponds to TRP #0 and the second reception beam corresponds to TRP #1. The different TRPs may correspond to the same service cell or different service cells of the terminal, or some of the TRPs correspond to the service cell(s) of the terminal and some of the TRPs correspond to the neighboring cell(s) of the terminal, which is not limited by the present disclosure.

In this embodiment of the present disclosure, the first control information and the second control information received in the at least one second time slot above are used to carry the same DCI, i.e., the first control information and the second control information received in the at least one second time slot above are first DCI of a plurality of repeated sendings by the network device.

In this embodiment of the present disclosure, the first time slot is used for a first sending in the plurality of repeated sendings, and the at least one second time slot is used for one or more sendings after the first sending in the plurality of repeated sendings.

In one possible implementation of this embodiment of the present disclosure, the terminal device is configured with a first SS set and a second SS set. The slots corresponding to the first SS set and the second SS set are different, and the time slots used to send DCI in the SS set appear periodically, for example, the period for the first SS set is 2 slots, and the index values of the time slots corresponding to the first SS set may be 0, 2, 4, . . . ; and the period for the second SS set is also 2 slots, and the index values of the time slots corresponding to the second SS set may be 1, 3, 5, . . . .

In one embodiment, the time slot with an odd or even index value in the SS set can be specified as the first time slot. For example, if a time slot with an even index value in a SS set is specified as the first time slot, the first time slot should be the time slot corresponding to the first SS set, i.e., the time slot corresponding to the first SS set is used for the first sending of the plurality of repeated sendings. The second time slot is a first one arrived after the first time slot and corresponds to the second SS set, i.e., the time slot corresponding to the second SS set is used for one or more sendings after the first sending in the plurality of repeated sendings.

For another example, if a time slot with an odd index value in a SS set is specified as the first time slot, the first time slot should be the time slot corresponding to the second SS set, i.e., the time slot corresponding to the second SS set is used for the first sending of the plurality of repeated sendings. The second time slot is a first one arrived after the first time slot and corresponds to the first SS set, i.e., the time slot corresponding to the first SS set is used for one or more sendings after the first sending in the plurality of repeated sendings.

In another embodiment, the time slot in the SS set whose index value is an integer multiple of the first value may be specified as the first time slot. The first value is predetermined, for example, the first value may be 4, i.e., some of the time slots in the first SS set may be specified as the first time slot. The second time slot is a first one arrived after the first time slot and corresponds to the second SS set.

In yet another embodiment, the time slot in the SS set that has an index value whose remainder divided by the second value matches the third value may be specified as the first time slot, wherein the second value and the third value are predetermined, for example, the second value can be 4 and the third value can be 1 or 2.

For example, when the second value can be 4 and the third value is 1, the index value that meets the defined condition is 1, 5, 9 . . . , some of the time slots in the second SS set can serve as the first time slot, and the second time slot is a first one arrived after the first time slot and corresponds to the first SS set, i.e., 2, 6, 10 . . . .

For example, when the second value can be 4 and the third value is 1 or 2, the index value that meets the defined condition can be 1, 5, 9 . . . or 2, 6, 10 . . . , i.e., both the first SS set and the second SS set can be used for the first sending of DCI. In this case, according to the frequency domain resources of the first SS set and the second SS set, the frequency domain resource, among the frequency domain resources corresponding to the first SS set, used for the first sending of the plurality of repeated sendings, i.e., the first frequency domain resource, can be determined, and the frequency domain resource, among the frequency domain resources corresponding to the second SS set, used for one or more sendings after the first sending of the plurality of repeated sendings, i.e., the second frequency domain resource, can be determined. The specific implementation process can be seen in the implementation process of the embodiment shown in FIG. 3 and will not be repeated here.

In another possible implementation of this embodiment of the present disclosure, when the first SS set and the second SS set correspond to same slots, the slots used to send DCI in the SS sets appear periodically, for example, the period for both the first SS set and the second SS set is 2 slots, and the corresponding slot index values are 0, 2, 4, . . . . In order to determine which slot is used for the first sending and which slot is used for the second sending, different PDCCH candidates can be employed.

For example, the first SS set and the second SS set are different SS sets, and an association exists between a first frequency domain resource of the first SS set occupied by the first control information and a second frequency domain resource of the second SS set occupied by the second control information. The association may include an association relationship between a PDCCH candidate index in the first frequency domain resource and a PDCCH candidate index in the second frequency domain resource. For example, the PDCCH candidate index of the first SS set is i and the PDCCH candidate index of the second SS set is i+j, which are used for sending the same DCI. The association may be sent to the terminal by the network device through control signaling such as RRC signaling, MAC signaling, DCI signaling, etc., or it may be pre-configured for the terminal according to a communication protocol specified by a communication standardization organization (e.g., 3GPP communication organization), or it may have been configured when the terminal leaves the factory, without limitation here.

Step 402, decoding the first control information and/or the second control information to obtain the first downlink control information.

In this embodiment of the present disclosure, step 402 may be implemented in any one of the embodiments of the present disclosure, which is not limited in this embodiment of the present disclosure and will not be repeated.

In the method for transmitting the downlink control information of the embodiments of the present disclosure, the terminal receives the first control information from the network device using the first reception beam in the first time slot, and the second control information from the network device using the second reception beam in at least one second time slot, wherein the first reception beam and the second reception beam correspond to the same or different TRPs, and the first control information and the second control information received in the at least one second time slot above are the first downlink control information of a plurality of repeated sendings by the network device; and the terminal decodes the first control information and/or the second control information to obtain the first downlink control information. As a result, the network device uses multiple beams to send the same DCI repeatedly in the corresponding multiple time slots, which can facilitate the terminal to receive and decode the above DCI and improve the reliability of downlink transmission.

In the embodiments of the present disclosure, another method for transmitting downlink control information is provided. FIG. 5 is a flow diagram of another method for transmitting downlink control information provided by embodiments of the present disclosure. The method for transmitting the downlink control information can be applied in a terminal.

As shown in FIG. 5, the method for transmitting the downlink control information may include the following steps.

Step 501, receiving, using a first reception beam, first control information from a network device in a first time slot, and receiving, using a second reception beam, second control information from the network device in at least one second time slot; wherein the second time slot is after the first time slot.

Here, the first reception beam and the second reception beam may correspond to the same TRP, or the first reception beam and the second reception beam may correspond to different TRPs. For example, the first reception beam corresponds to TRP #0 and the second reception beam corresponds to TRP #1. The different TRPs may correspond to the same service cell or different service cells of the terminal, or some of the TRPs correspond to the service cell(s) of the terminal and some of the TRPs correspond to the neighboring cell(s) of the terminal, which is not limited by the present disclosure.

In this embodiment of the present disclosure, the first control information and the second control information received in the at least one second time slot above are used to carry the same DCI, i.e., the first control information and the second control information received in each second time slot are first DCI of a plurality of repeated sendings by the network device.

In this embodiment of the present disclosure, the network device may repeatedly send the first DCI to the terminal multiple times, wherein the first DCI sent repeatedly includes the first control information and the second control information, and accordingly, the terminal may receive the first control information from the network device using the first reception beam in the first time slot, and the second control information from the network device using the second reception beam in at least one second time slot.

Step 502, merging the first control information and third control information, and decoding the merged first control information and the third control information; wherein the third control information is sent by the network device in a third time slot prior to the first time slot.

In this embodiment of the present disclosure, when the first reception beam and the second reception beam correspond to different TRPs, i.e., in the case where the beams of two TRPs are used to send the same DCI repeatedly, the beam corresponding to the third time slot and the beam corresponding to the second time slot may be the same. Alternatively, when the first reception beam and the second reception beam correspond to the same TRP, the beam corresponding to the third time slot is different from the beam corresponding to the first time slot, for example, the beam corresponding to the third time slot can be the same as the beam corresponding to the second time slot.

Step 503, merging, in response to a failure of the decoding of the merged first control information and the third control information, the first control information and the second control information, and decoding the merged first control information and the second control information to obtain the first downlink control information.

It should be noted that in the case that the terminal cannot determine which two slots used to send the same DCI, for the first control information, the terminal can first decode the first control information independently. If the decoding is not correct, the terminal can merge and decode the first control information with the third control information in the third time slot prior to the first time slot. In the case that the merging and decoding of the first control information and the third control information is correct, it can be determined that the first control information and the third control information are the same DCI. In the case that the merging and decoding of the first control information and the third control information fails, the first control information and the third control information may be the same DCI, or may be different DCIs, and the terminal can further decode the second control information independently and/or merge and decode the first control information and the second control information. Similarly, if the merging and decoding of the first control information and the second control information is correct, it can be determined that the first control information and the second control information are the same DCI, while if the merging and decoding of the first control information and the second control information fails, it can be determined that the first control information and the second control information may be the same DCI, or may be different DCIs. Thus, the terminal, without the relevant indication information, can merge the control information received in each slot with the control information received in a preceding slot for decoding, and if the decoding is incorrect, the terminal merges the control information received in this slot with the control information received in a next slot for decoding, so as to identify multiple pieces of control information as the same DCI, which can improve the success rate of DCI reception.

In the method for transmitting the downlink control information of the embodiments of the present disclosure, the terminal receives the first control information from the network device using the first reception beam in the first time slot, and the second control information from the network device using the second reception beam in at least one second time slot, wherein the first reception beam and the second reception beam correspond to the same or different TRPs, and the first control information and the second control information received in the at least one second time slot above are the first downlink control information of a plurality of repeated sendings by the network device; and the terminal decodes the first control information and/or the second control information to obtain the first downlink control information. As a result, the network device uses multiple beams to send the same DCI repeatedly in the corresponding multiple time slots, which can facilitate the terminal to receive and decode the above DCI and improve the reliability of downlink transmission.

In the embodiments of the present disclosure, another method for transmitting downlink control information is provided. FIG. 6 is a flow diagram of another method for transmitting downlink control information provided by embodiments of the present disclosure. The method for transmitting the downlink control information can be applied in a network device.

As shown in FIG. 6, the method for transmitting the downlink control information may include the following steps.

Step 601, repeatedly sending first downlink control information to a terminal; wherein the first downlink control information of a plurality of repeated sendings includes first control information and second control information, the first control information is received by the terminal using a first reception beam in a first time slot, and the second control information is received by the terminal using a second reception beam in at least one second time slot; and the first reception beam and the second reception beam correspond to a same TRP or different TRPs; and the first control information and/or the second control information is configured for decoding by the terminal.

In this embodiment of the present disclosure, the network device may send the first DCI to the terminal repeatedly, wherein the first DCI of a plurality of repeated sendings includes first control information and second control information, and accordingly, the terminal may receive the first control information from the network device using the first reception beam in the first time slot, and the second control information from the network device using the second reception beam in at least one second time slot. The first control information and the second control information received in each second time slot are used to carry the same DCI, i.e., the first control information and the second control information received in each second time slot are first DCI of a plurality of repeated sendings by the network device.

Here, the first reception beam and the second reception beam may correspond to the same TRP, or the first reception beam and the second reception beam may correspond to different TRPs. For example, the first reception beam corresponds to TRP #0 and the second reception beam corresponds to TRP #1. The different TRPs may correspond to the same service cell or different service cells of the terminal, or some of the TRPs correspond to the service cell(s) of the terminal and some of the TRPs correspond to the neighboring cell(s) of the terminal, which is not limited by the present disclosure.

In this embodiment of the present disclosure, the terminal, after receiving the first control information and the second control information, may decode the first control information and/or the second control information. That is, the terminal may decode the first control information independently, or may decode the second control information independently, or may merge the first control information and the second control information and decode the merged first control information and the second control information to obtain the first DCI. The decoding method may include at least one of: decoding the first control information independently, decoding the second control information independently, and decoding the merged first control information and the second control information. Decoding the second control information independently includes that when one piece of second control information is sent in one time slot, the one piece of second control information is decoded independently, and further includes that when multiple pieces of second control information are sent in multiple time slots, decoding is performed independently for each piece of second control information and decoding is performed for at least any two pieces of merged second control information of the multiple pieces of second control information. Thus, the network device uses multiple beams to repeatedly send the same DCI in the corresponding multiple time slots, thereby facilitating the terminal to receive and decode the above DCI and improving the reliability of downlink transmission.

In one possible implementation of this embodiment of the present disclosure, the first time slot is used for a first sending in the plurality of repeated sendings; and the at least one second time slot is used for one or more sendings after the first sending in the plurality of repeated sendings.

In one possible implementation of this embodiment of the present disclosure, the first time slot belongs to a first Search Space (SS) set and the at least one second time slot belongs to a second SS set.

In one possible implementation of this embodiment of the present disclosure, a quantity of the at least one second time slot is 1; and the second time slot is a first one arrived after the first time slot and corresponds to the second SS set.

In one possible implementation of this embodiment of the present disclosure, the first SS set is predetermined, or the first SS set is configured by the network device.

In one possible implementation of this embodiment of the present disclosure, the first SS set and the second SS set are associated with different control resource sets; or the first SS set and the second SS set are associated with a same control resource set.

In one possible implementation of this embodiment of the present disclosure, the first control information occupies a first frequency domain resource of a first SS set, and the second control information occupies a second frequency domain resource of a second SS set; and the first frequency domain resource is among one or more frequency domain resources corresponding to the first SS set, and is used for a first sending in a plurality of repeated sendings; and the second frequency domain resource is among one or more frequency domain resources corresponding to the second SS set, and is used for one or more sendings after the first sending in the plurality of repeated sendings.

In one possible implementation of this embodiment of the present disclosure, the first SS set and the second SS set are different SS sets; the one or more frequency domain resources corresponding to the first SS set further include a third frequency domain resource; and the third frequency domain resource is used for one or more sendings after a first sending of a plurality of repeated sendings in the first time slot.

In one possible implementation of this embodiment of the present disclosure, the first SS set and the second SS set are different SS sets; the one or more frequency domain resources corresponding to the second SS set further include a fourth frequency domain resource; and the fourth frequency domain resource is used for a first sending of a plurality of repeated sendings in the second time slot.

In one possible implementation of this embodiment of the present disclosure, the third frequency domain resource, or, the fourth frequency domain resource, is used for at least one sending of the plurality of repeated sendings of second downlink control information, the second downlink control information being different from the first downlink control information.

In one possible implementation of this embodiment of the present disclosure, the first SS set and the second SS set are different SS sets, and an association exists between the first frequency domain resource and the second frequency domain resource.

In one possible implementation of this embodiment of the present disclosure, the association includes an association relationship between a PDCCH candidate in the first frequency domain resource and a PDCCH candidate in the second frequency domain resource.

In one possible implementation of this embodiment of the present disclosure, a time slot in at least one SS set that has an index value meeting a defined condition serves as the first time slot, and the defined condition includes at least one of: the index value is an odd number or an even number; the index value is an integer multiple of a first value; and a remainder of the index value divided by a second value matches a third value.

It should be noted that the explanatory description of the method for transmitting the downlink control information performed by the terminal in any of the preceding embodiments of FIGS. 1 to 5 is also applicable to the method for transmitting the downlink control information performed by the network device in this embodiment, which is implemented on similar principles and will not be repeated here.

In the method for transmitting the downlink control information of the embodiments of the present disclosure, the network device sends the first DCI repeatedly to the terminal; wherein the first DCI of the plurality of repeated sendings includes the first control information and the second control information, the first control information is received by the terminal using the first reception beam in the first time slot, and the second control information is received by the terminal using the second reception beam in at least one second time slot; and the first reception beam and the second reception beam correspond to a same TRP or different TRPs; and the first control information and/or the second control information is used for decoding by the terminal. Thus, the network device uses multiple beams to send the same DCI repeatedly in the corresponding multiple time slots, which can facilitate the terminal to receive and decode the above DCI and improve the reliability of downlink transmission.

The present disclosure also discloses a method for processing downlink control information that may be applied to a terminal, including as follows.

The first DCI sent by the network device is received in the first and second time slots by one or more TRPs based on the downlink control information (DCI) transmission mode information, wherein the first DCI is transmitted repeatedly in the first time slot and the second time slot in multiple times. In one embodiment, the DCI transmission mode information indicates that both the first time slot and the second time slot are used to transmit the same DCI. The first DCI of a plurality of repeated transmissions may include at least first control information and second control information. The DCI transmission mode information may be sent to the terminal by the network device via control signaling such as RRC signaling, MAC signaling, DCI signaling, etc., or may be pre-configured for the terminal according to a communication protocol specified by a communication standardization organization (e.g. 3GPP communication organization), or may have been configured when the terminal leaves the factory, without limitation here. In one embodiment, the DCI transmission mode information may be a DCI reception configuration.

The terminal may further determine, based on the DCI transmission mode information, that the first time slot is used for the first sending in the plurality of repeated sendings and that the at least one second time slot is used for one or more sendings after the first sending in the plurality of repeated sendings. In one embodiment, the first time slot belongs to the first SS set and the at least one second time slot belongs to the second SS set. The terminal may also determine, based on the DCI transmission mode information, that the second time slot is the first one arrived after the first time slot and corresponds to the second SS set. The control resource sets associated with the first SS set and the second SS set may be different or may be the same.

The terminal may receive the first control information from the network device using the first reception beam in the first time slot and the second control information from the network device using the second reception beam in at least one second time slot. The first reception beam and the second reception beam may correspond to the same or different TRPs.

The terminal may also determine, based on the DCI transmission mode information, that the first control information occupies the first frequency domain resource of the first SS set and that the second control information occupies the second frequency domain resource of the second SS set. The first frequency domain resource may be the frequency domain resource among the frequency domain resources corresponding to the first SS set that is used for the first sending of the plurality of repeated sendings. Further, the second frequency domain resource may be the frequency domain resource among the frequency domain resources corresponding to the second SS set that is used for one or more sendings after the first sending in the plurality of repeated sendings.

When the first SS set and the second SS set are the same SS set, the time slots associated with the two sets are the same, or the time slots of the two SS sets that can be used for sending DCI appear with the same period. Thus, by dividing the frequency resources for the first sending and subsequent multiple sendings in above way, the problem of the terminal being unable to recognize the first sending and subsequent sendings in the plurality of repeated sendings of DCI can be solved.

In order to further utilize the frequency resources, when the first SS set and the second SS set are different SS sets, a third frequency domain resource may be included in the frequency domain resources corresponding to the first SS set. The third frequency domain resource may be used for one or more sendings after a first sending in a plurality of repeated sendings of the other DCI in the first time slot. Similarly, a fourth frequency domain resource may be included in the frequency domain resources corresponding to the second SS set. The fourth frequency domain resource may be used for a first sending in a plurality of repeated sendings of the other DCI in the second time slot. This "other DCI" is a different DCI than the first DCI.

In one embodiment, when the first SS set and the second SS set are different SS sets, an association exists between the first frequency domain resource and the second frequency domain resource. For example, the association includes an association relationship between a PDCCH candidate in the first frequency domain resource and a PDCCH candidate in the second frequency domain resource. The association relationship may be sent to the terminal by the network device through control signaling such as RRC signaling, MAC signaling, DCI signaling, etc., or it may be pre-configured for the terminal according to a communication protocol specified by a communication standardization organization (e.g., 3GPP communication organization), or it may have been configured when the terminal leaves the factory, without limitation here.

The terminal may decode the first control information and/or the second control information to obtain the first DCI.

The terminal may determine, based on the index value of the time slot in the SS set, whether the time slot is the first time slot. The determination condition may be:

the index value is an odd number or an even number;
the index value is an integer multiple of a first value; and
a remainder of the index value divided by a second value matches a third value. The first value, second value and third value may be specified by the protocol, or notified to the terminal by the network device through control signaling, or have been configured when the terminal leaves the factory.

The present disclosure also discloses a method of processing downlink control information that may be applied to a network device (e.g., a base station), including as follows.

A first DCI is sent to the terminal in the first and second time slots via one or more TRPs based on DCI transmission mode information. The network device may transmit, based on the DCI transmission mode information, the first DCI repeatedly in the first time slot and the second time slot. In one embodiment, the DCI transmission mode information indicates that the first time slot and the second time slot are used to transmit the same DCI. The first DCI of a plurality of repeated transmissions may include at least first control information and second control information. In one embodiment, the network device may send the DCI transmission mode information to the terminal via control signaling such as RRC signaling, MAC signaling, DCI signaling, etc. Alternatively, the DCI transmission mode information may be determined according to a communication protocol specified by a standardized organization (e.g., 3GPP communication organization) or may have been configured when the network device leaves the factory, without limitation here. In one embodiment, the DCI transmission mode information may be a DCI transmission configuration.

The network device may determine, based on the DCI transmission mode information, that the first time slot is used for the first sending in the plurality of repeated sendings and that the at least one second time slot is used for one or more sendings after the first sending in the plurality of repeated sendings. In one embodiment, the first time slot belongs to the first SS set and the at least one second time slot belongs to the second SS set. The network device may also determine, based on the DCI transmission mode information, that the second time slot is the first one arrived after the first time slot and corresponds to the second SS set. The control resource sets associated with the first SS set and the second SS set may be different or may be the same.

The network device may send the first control information in the first time slot using a first transmission beam and the second control information in at least one second time slot using a second transmission beam. The first transmission beam and the second transmission beam may correspond to the same or different TRPs.

The network device may also determine, based on the DCI transmission mode information, that the first control information occupies a first frequency domain resource of the first SS set and that the second control information occupies a second frequency domain resource of the second SS set. The first frequency domain resource may be the frequency domain resource among the frequency domain resources corresponding to the first SS set that is used for the first sending of the plurality of repeated sendings. Further, the second frequency domain resource may be the frequency domain resource among the frequency domain resources corresponding to the second SS set that is used for one or more sendings after the first sending in the plurality of repeated sendings.

When the first SS set and the second SS set are the same SS set, the time slots associated with the two sets are the same, or the time slots of the two SS sets that can be used for sending DCI appear with the same period. Thus, by dividing the frequency resources for the first sending and subsequent multiple sendings in above way, the problem of the terminal being unable to recognize the first sending and subsequent sendings in the plurality of repeated sendings of DCI can be solved.

In order to further utilize the frequency resources, when the first SS set and the second SS set are different SS sets, a third frequency domain resource may be included in the frequency domain resources corresponding to the first SS set. The third frequency domain resource may be used for one or more sendings after a first sending in a plurality of repeated sendings of the other DCI in the first time slot. Similarly, a fourth frequency domain resource may be included in the frequency domain resources corresponding to the second SS set. The fourth frequency domain resource may be used for a first sending in a plurality of repeated sendings of the other DCI in the second time slot. This "other DCI" is a different DCI than the first DCI.

In one embodiment, when the first SS set and the second SS set are different SS sets, an association exists between the first frequency domain resource and the second frequency domain resource. For example, the association includes an association relationship between a PDCCH candidate in the first frequency domain resource and a PDCCH candidate in the second frequency domain resource. The association relationship may be sent to the terminal by the network device through control signaling such as RRC signaling, MAC signaling, DCI signaling, etc., or it may be pre-configured for the terminal according to a communication protocol specified by a communication standardization organization (e.g., 3GPP communication organization), or it may have been configured when the terminal leaves the factory, without limitation here.

The terminal may decode the first control information and/or the second control information to obtain the first DCI.

The terminal may determine, based on the index value of the time slot in the SS set, whether the time slot is the first time slot. The determination condition may be:

the index value is an odd number or an even number;
the index value is an integer multiple of a first value; and

US 12,696,290 B2

23 a remainder of the index value divided by a second value matches a third value. The first value, second value and third value may be specified by the protocol, or notified to the terminal by the network device through control signaling, or have been configured when the terminal leaves the factory.

It should be noted that the explanatory description and technical details of the method for transmitting the downlink control information performed by the terminal and/or network device in any of the preceding embodiments of FIGS. 1 to 6 are also applicable to the aforementioned terminal and/or network device with similar principles of implementation for those of skill in the art and will not be repeated here.

In one embodiment of the present disclosure, the terminal receives the first control information sent by the network device in the first time slot and the second control information sent in the second time slot. The first control information and the second control information are used to carry the same DCI.

In one embodiment of the present disclosure, the first time slot and the second time slot are in different time slots.

In one embodiment of the present disclosure, the first time slot and the second time slot are consecutive or inconsecutive.

In a first embodiment of the present disclosure, a slot of one of the SS sets is a starting slot used for sending each DCI, i.e., the slot of that SS set is used for the first sending of DCI and a slot of the other SS set is used for the second sending of DCI.

In this case, it is equivalent to two SS sets corresponding to different slots. The slots used to send DCI in the SS set appear periodically, for example, the period for the first SS set is 2 slots, and the corresponding slots are 0, 2, 4, . . . , and the period for the second SS set is also 2 slots, and the corresponding slots are 1, 3, 5, . . . .

The network device can use indication signaling to indicate the terminal that the DCI sent in a slot of the first SS set is the first time it is sent, and the DCI sent in a slot that appears for the first time in the second SS set and follows that slot of the first SS set is the second time it is sent. That is, for the terminal, the DCIs sent in slot #0 and slot #1 are the same, and the DCIs sent in slot #2 and slot #3 are the same.

If the network device uses indication signaling to indicate the terminal that the DCI sent in a slot of the second SS set is the first time it is sent, and the DCI sent in a slot that appears for the first time in the first SS set and follows that slot of the second SS set is the second time it is sent, for the terminal, the DCIs sent in slot #1 and slot #2 are the same, and the DCIs sent in slot #3 and slot #4 are the same.

For the terminal, only the DCIs, in two slots where the same DCI is sent, need to be merged and decoded.

It should be noted that the above-mentioned indication signaling for network device can also be written in the standard, and written to the terminal chip, i.e., as a default method.

In a second embodiment of the present disclosure, the slots of different SS sets can be used as starting slots, and the corresponding PDCCH candidate index used for each SS set's slot as a starting slot is different from that used for each SS set's slot as a non-starting slot. For example, in SS set #1, PDCCH candidate indexes of 0 to 7 are used for the first sending of DCI, and PDCCH candidate indexes of 8 to 15 are used for the second sending of DCI.

The disadvantage of the first embodiment described above is that DCI can only be sent when the slot of the SS set used for the first sending appears, which may cause a delay in the reception of the terminal. In order to solve the above problem, the second embodiment is proposed.

In a first example, when the slots corresponding to two SS sets are different, the slots used to send DCI in the SS sets appear periodically, for example, the period for the first SS set is 2 slots, and the corresponding slots are 0, 2, 4, . . . , and the period for the second SS set is also 2 slot, and the corresponding slots are 1, 3, 5, . . . .

The slots of the above two SS sets can both be used for the first sending of DCI. However, if there is no distinction, the terminal cannot determine which is the first sending and which is the second sending, and may merge and decode the control information that is not used to send the same DCI, resulting in decoding errors and reducing the success rate of DCI reception. Therefore, it is possible to distinguish the first sending or the second sending from the frequency domain. That is, for the first SS set, which contains multiple PDCCH candidates, such as M PDCCH candidates, it can be specified that M/2 of them are used for the first sending and the other M/2 are used for the second sending, and the PDCCH candidate indexes for the first and second sendings can be comb-shaped in the frequency domain, i.e., PDCCH candidate indexes of 0, 2, 4, . . . , M−2, can be used for the first sending, and PDCCH candidate indexes of 1, 3, 5, . . . , M−1, can be used for the second sending. Alternatively, the PDCCH candidate indexes for the first sending and the second sending may be consecutive, i.e., PDCCH candidate indexes of 0, 1, 2, 3, . . . , (M/2)−1, can be used for the first sending, and PDCCH candidate indexes of M/2, (M/2)+1, (M/2)+2, . . . , M−1, can be used for the second sending.

In a second example, when the slots corresponding to two SS sets are the same, the slots used to send DCI in the SS sets appear periodically, for example, the period for both SS sets is 2 slots, e.g., the corresponding slots are 0, 2, 4, . . . . Similarly, in order to determine which slot is used for the first sending and which slot is used for the second sending, different PDCCH candidates can be employed. The method for dividing the two SS sets can be different, and PDCCH candidates with the same index in the two SS sets can be associated, so that the link relationship is simple. Of course, the link relationship can also be changed. For example, a PDCCH candidate in the first SS set have an index i and a PDCCH candidate in the second SS set has an index i+j, which are used to send the same DCI, and the division of the indexes of the PDCCH candidates in the two SS sets that are used for the first sending and the second sending, need to correspond to the association relationship. For example, in the first SS set, PDCCH candidate indexes of 0, 2, 4, . . . , can be used for the first sending, and PDCCH candidate indexes of 1, 3, 5, . . . , can be used for the second sending; and in the second SS set, PDCCH candidate indexes of 0, 2, 4, . . . , can be used for the second sending, and PDCCH candidate indexes of 1, 3, 5, . . . , can be used for the first sending.

In a third embodiment of the present disclosure, a slot is specified as a starting slot, for example, the slot has an odd or even index value, or the slot is specified based on a remainder of a modulo operation with N.

In one possible implementation, when the slots corresponding to two SS sets are different, the slots used to send DCI in the SS sets appear periodically, for example, the period for the first SS set is 2 slots, and the corresponding slots are 0, 2, 4, . . . ; and the period for the second SS set is also 2 slots, and the corresponding slots are 1, 3, 5, . . . .

When specifying the starting slot as an odd number, it means that the slot of the second SS set is specified as the starting slot.

When specifying the starting slot as an even number, it means that the slot of the first SS set is specified as the staring slot.

When specifying the starting slot as a multiple of 4, it means that some of the slots in the first SS set are specified as the starting slots.

When specifying that the remainder of the modulo operation with 4 on the starting slot is 1, it means that some of the slots in the second SS set are specified as the starting slots.

When specifying that the remainder of the modulo operation with 4 on the starting slot is 1 or 2, it means that some of the slots in the first SS set are specified as the starting slots, or some of the slots in the second SS set are specified as the starting slots, in which case the first example in the second embodiment can be combined.

In another possible implementation, when the slots corresponding to two SS sets are the same, the slots used to send DCI in the SS sets appear periodically, for example, the period for both SS sets is 2 slots, e.g., the corresponding slots are 0, 2, 4, . . . .

The second example in the second embodiment can be combined when either slot is sent.

It should be noted that the above three embodiments can be used independently, or, alternatively, in combination, which is not limited by the embodiments of the present disclosure.

In a fourth embodiment of the present disclosure, when the terminal cannot determine which two slots send the same DCI, then for the first control information, the terminal may decode the first control information independently, and if the decoding is incorrect, the first control information is merged with the third control information in the third time slot before the first time slot for decoding. If the decoding is correct, it is determined that the first control information and the third control information are the same DCI, and if the decoding is incorrect, the first control information and the third control information may be the same DCI or may be different DCIs. In the case of incorrect decoding, the terminal may further decode the second control information independently, and/or, merge the first control information and the second control information for decoding. Similarly, if the decoding of the merged first control information and the second control information is correct, it is determined that the first control information and the second control information are the same DCI, and if the decoding of the merged first control information and the second control information is incorrect, it is determined that the first control information and the second control information may be the same DCI or may be different DCIs.

Therefore, the first to third embodiment above is to allow the terminal to determine which two slots' control information is the same DCI, so there is no need to merge and decode the control information in two slots that are not the same DCI, which can reduce the number of times the terminal decodes. While there is no relevant instruction in the fourth embodiment, the terminal needs to merge and decode the control information in each slot with the control information in the previous slot, and if the decoding is incorrect, further to merge and decode the control information of that slot with the control information of the later one, which the success rate of decoding is basically the same although the decoding times are increased.

Here, the first time slot is before the second time slot.

Here, the third time slot is before the first time slot.

In an embodiment of the present disclosure, the above two SS sets can be associated with the same CORESET, or the above two SS sets can also be associated with different CORESETs, where each SS set corresponds to a different TCI state or SpatialRelationInfo.

Corresponding to the method for transmitting the downlink control information provided in the embodiments of FIGS. 1 to 5 above, the present disclosure further provides an apparatus for transmitting downlink control information. Since the apparatus for transmitting the downlink control provided in the embodiments of the present disclosure corresponds to the method for transmitting the downlink control information provided in the embodiments of FIGS. 1 to 5 above, the implementation of the method for transmitting the downlink control information is also applicable to the apparatus for transmitting the downlink control information provided in the embodiments of the present disclosure, and will not described in detail in this embodiment of the present disclosure.

FIG. 7 is a schematic diagram of a structure of an apparatus for transmitting downlink control information provided by embodiments of the present disclosure. This apparatus can be applied in a terminal. As shown in FIG. 7, the apparatus 700 for transmission the downlink control information may include a receiving module 701 and a decoding module 702.

The receiving module 701 is configured to receive, using a first reception beam, first control information from a network device in a first time slot, and receive, using a second reception beam, second control information from the network device in at least one second time slot; wherein the first reception beam and the second reception beam correspond to a same TRP or different TRPs, and the first control information and the second control information received in the at least one second time slot are first downlink control information of a plurality of repeated sendings by the network device.

The decoding module 702 is configured to decode the first control information and/or the second control information to obtain the first downlink control information.

Optionally, the first time slot is configured for a first sending in the plurality of repeated sendings; and the at least one second time slot is configured for one or more sendings after the first sending in the plurality of repeated sendings.

Optionally, the first time slot belongs to a first SS set and the at least one second time slot belongs to a second SS set.

Optionally, a quantity of the at least one second time slot is 1; and the second time slot is a first one arrived after the first time slot and corresponds to the second SS set.

Optionally, the first SS set is predetermined, or the first SS set is configured by the network device.

Optionally, the first SS set and the second SS set are associated with different control resource sets; or the first SS set and the second SS set are associated with a same control resource set.

Optionally, the first control information occupies a first frequency domain resource of a first SS set, and the second control information occupies a second frequency domain resource of a second SS set; and the first frequency domain resource is among one or more frequency domain resources corresponding to the first SS set, and is configured for a first sending in a plurality of repeated sendings; and the second frequency domain resource is among one or more frequency domain resources corresponding to the second SS set, and is configured for one or more sendings after the first sending in the plurality of repeated sendings.

Optionally, the first SS set and the second SS set are different SS sets; the one or more frequency domain resources corresponding to the first SS set comprise a third frequency domain resource; and the third frequency domain resource is configured for one or more sendings after a first sending of a plurality of repeated sendings in the first time slot.

Optionally, the first SS set and the second SS set are different SS sets; the one or more frequency domain resources corresponding to the second SS set comprise a fourth frequency domain resource; and the fourth frequency domain resource is configured for a first sending of a plurality of repeated sendings in the second time slot.

Optionally, the third frequency domain resource, or, the fourth frequency domain resource, is configured for at least one sending of the plurality of repeated sendings of second downlink control information, the second downlink control information being different from the first downlink control information.

Optionally, the first SS set and the second SS set are different SS sets, and an association exists between the first frequency domain resource and the second frequency domain resource.

Optionally, the association comprises an association relationship between a PDCCH candidate in the first frequency domain resource and a PDCCH candidate in the second frequency domain resource.

Optionally, a time slot in at least one SS set that has an index value meeting a defined condition serves as the first time slot; and the defined condition comprises at least one of: the index value is an odd number or an even number; the index value is an integer multiple of a first value; and a remainder of the index value divided by a second value matches a third value.

Optionally, the decoding module 702 is further configured to: merge the first control information and third control information, and decode the merged first control information and the third control information; wherein the third control information is sent by the network device in a third time slot prior to the first time slot; and merge, in response to a failure of the decoding of the merged first control information and the third control information, the first control information and the second control information, and decode the merged first control information and the second control information.

According to the apparatus for transmitting the downlink control information of the embodiments of the present disclosure, the terminal receives the first control information from the network device using the first reception beam in the first time slot, and the second control information from the network device using the second reception beam in at least one second time slot, wherein the first reception beam and the second reception beam correspond to the same or different TRPs, and the first control information and the second control information received in the at least one second time slot above are the first downlink control information of a plurality of repeated sendings by the network device; and the terminal decodes the first control information and/or the second control information to obtain the first downlink control information. As a result, the network device uses multiple beams to send the same DCI repeatedly in the corresponding multiple time slots, which can facilitate the terminal to receive and decode the above DCI and improve the reliability of downlink transmission.

Corresponding to the method for transmitting the downlink control information provided in the embodiments of FIG. 6 above, the present disclosure further provides an apparatus for transmitting downlink control information.

Since the apparatus for transmitting the downlink control information provided in this embodiment of the present disclosure corresponds to the method for transmitting the downlink control information provided in the embodiments of FIG. 6 above, the implementation of the method for transmitting the downlink control information provided in the embodiments of FIG. 6 is also applicable to the apparatus for transmitting the downlink control information provided in this embodiment, and will not described in detail in this embodiment.

FIG. 8 is a schematic diagram of a structure of another apparatus for transmitting downlink control information provided by embodiments of the present disclosure. This apparatus can be applied in a network device.

As shown in FIG. 8, the apparatus 800 for transmitting the downlink control information may include: a sending module 801.

The sending module 801 is configured to repeatedly send first downlink control information to a terminal.

The first downlink control information of a plurality of repeated sendings comprises first control information and second control information, the first control information is received by the terminal using a first reception beam in a first time slot, and the second control information is received by the terminal using a second reception beam in at least one second time slot; and the first reception beam and the second reception beam correspond to a same TRP or different TRPs; and the first control information and/or the second control information is configured for decoding by the terminal.

Optionally, the first time slot is configured for a first sending in the plurality of repeated sendings; and the at least one second time slot is configured for one or more sendings after the first sending in the plurality of repeated sendings.

Optionally, the first time slot belongs to a first SS set and the at least one second time slot belongs to a second SS set.

Optionally, a quantity of the at least one second time slot is 1; and the second time slot is a first one arrived after the first time slot and corresponds to the second SS set.

Optionally, the first SS set is predetermined, or the first SS set is configured by the network device.

Optionally, the first SS set and the second SS set are associated with different control resource sets; or the first SS set and the second SS set are associated with a same control resource set.

Optionally, the first control information occupies a first frequency domain resource of a first SS set, and the second control information occupies a second frequency domain resource of a second SS set; and the first frequency domain resource is among one or more frequency domain resources corresponding to the first SS set, and is configured for a first sending in a plurality of repeated sendings; and the second frequency domain resource is among one or more frequency domain resources corresponding to the second SS set, and is configured for one or more sendings after the first sending in the plurality of repeated sendings.

Optionally, the first SS set and the second SS set are different SS sets; the one or more frequency domain resources corresponding to the first SS set comprise a third frequency domain resource; and the third frequency domain resource is configured for one or more sendings after a first sending of a plurality of repeated sendings in the first time slot.

Optionally, the first SS set and the second SS set are different SS sets; the one or more frequency domain resources corresponding to the second SS set comprise a fourth frequency domain resource; and the fourth frequency domain resource is configured for a first sending of a plurality of repeated sendings in the second time slot.

Optionally, the third frequency domain resource, or, the fourth frequency domain resource, is configured for at least one sending of the plurality of repeated sendings of second downlink control information, the second downlink control information being different from the first downlink control information.

Optionally, the first SS set and the second SS set are different SS sets, and an association exists between the first frequency domain resource and the second frequency domain resource.

Optionally, the association comprises an association relationship between a PDCCH candidate in the first frequency domain resource and a PDCCH candidate in the second frequency domain resource.

Optionally, a time slot in at least one SS set that has an index value meeting a defined condition serves as the first time slot; and the defined condition comprises at least one of: the index value is an odd number or an even number; the index value is an integer multiple of a first value; and a remainder of the index value divided by a second value matches a third value.

According to the apparatus for transmitting the downlink control information of the embodiments of the present disclosure, the network device sends the first DCI repeatedly to the terminal; wherein the first DCI of the plurality of repeated sendings includes the first control information and the second control information, the first control information is received by the terminal using the first reception beam in the first time slot, and the second control information is received by the terminal using the second reception beam in at least one second time slot; and the first reception beam and the second reception beam correspond to a same TRP or different TRPs; and the first control information and/or the second control information is used for decoding by the terminal. Thus, the network device uses multiple beams to send the same DCI repeatedly in the corresponding multiple time slots, which can facilitate the terminal to receive and decode the above DCI and improve the reliability of downlink transmission.

In order to realize the above embodiments, the present disclosure further proposes a communication device.

Embodiments of the present disclosure provide a communication device including a processor, a transceiver, a memory, and an executable program stored on the memory and capable of being run by the processor, wherein the processor, when running the executable program, performs the method for transmitting the downlink control information corresponding to any of the preceding embodiments of FIGS. 1 to 5, or, alternatively, performs the method for transmitting the downlink control information corresponding to the preceding embodiment of FIG. 6, or performs other methods for transmitting the downlink control information as disclosed in the present disclosure.

The communication device may be the terminal or network device as described above.

The processor may include various types of storage medium that is a non-transitory computer storage medium capable of continuing to store information thereon in memory after the communication device is powered down. Here, the communication device includes a terminal or a network device.

The processor may be connected to the memory via a bus, etc., for reading the executable program stored on the memory to perform the method for transmitting the downlink control information, e.g., as shown in at least one of FIGS. 1 to 6.

In order to achieve the above embodiments, the present disclosure further proposes a computer storage medium.

A computer storage medium provided by embodiments of the present disclosure, stores an executable program, which, when executed by a processor, can implement the method for transmitting the downlink control information as described above, for example, as shown in at least one of FIGS. 1 to 6.

FIG. 9 is a block diagram of a terminal provided by embodiments of the present disclosure. For example, the terminal 900 may be a cell phone, a computer, a digital broadcast subscriber device, a message sending and receiving device, a gaming console, a tablet device, a medical device, a fitness device, a personal digital assistant, and the like.

Referring to FIG. 9, the terminal 900 may include at least one of the following components: a processing component 902, a memory 904, a power supply component 906, a multimedia component 908, an audio component 910, an input/output (I/O) interface 912, a sensor component 914, and a communication component 916.

The processing component 902 typically controls the overall operation of the terminal 900, such as operations associated with display, telephone call, data communication, camera operation, and recording operations. The processing component 902 may include at least one processor 920 to execute instructions to complete all or some of the steps of the method described above. In addition, the processing component 902 may include at least one module that facilitates interaction between the processing component 902 and other components. For example, the processing component 902 may include a multimedia module to facilitate interaction between the multimedia component 908 and the processing component 902.

The memory 904 is configured to store various types of data to support operation at the terminal 900. Examples of such data include instructions for any application or method to operate on the terminal 900, contact data, phonebook data, messages, pictures, videos, etc. The memory 904 may be implemented by any type of volatile or non-volatile storage device or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, Disk or CD-ROM.

The power supply component 906 provides power to the various components of the terminal 900. The power supply component 906 may include a power management system, at least one power supply, and other components associated with generating, managing, and distributing power for the terminal 900.

The multimedia component 908 includes a screen that provides an output interface between the terminal 900 and the user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touch, swipe, and gesture on the touch panel. The touch sensor may not only sense the boundaries of the touch or swipe action, but also detect the wake-up time and pressure associated with the touch or swipe action. In some embodiments, the multimedia component 908 includes a front-facing camera and/or a rear-facing camera. The front-facing camera and/or rear-facing camera can receive external multimedia data when the terminal 900 is in an operating mode, such as shooting mode or video mode. Each front-facing camera and rear-facing camera may be a fixed optical lens system or have focal length and optical zoom capability.

The audio component 910 is configured to output and/or input audio signals. For example, the audio component 910 includes a microphone (MIC) configured to receive external audio signals when the terminal 900 is in an operating mode, such as call mode, recording mode, and voice recognition mode. The received audio signal may be further stored in the memory 904 or sent via the communication component 916. In some embodiments, the audio component 910 further includes a speaker for outputting the audio signal.

The I/O interface 912 provides an interface between the processing component 902 and peripheral interface modules, and the peripheral interface modules may be keypads, click wheels, buttons, etc. These buttons may include, but are not limited to: a home button, a volume button, a start button, and a lock button.

The sensor component 914 includes at least one sensor for providing status assessment of various aspects of the terminal 900. For example, the sensor component 914 may detect an open/closed state of the terminal 900, relative positioning of components, such as the components being the display and keypad of the terminal 900, and the sensor component 914 may also detect a change in position of the terminal 900 or a component of the terminal 900, the presence or absence of user contact with the terminal 900, an orientation or acceleration/deceleration of the terminal 900 and temperature changes of the terminal 900. The sensor component 914 may include a proximity sensor configured to detect the presence of nearby objects in the absence of any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication between the terminal 900 and other devices by wired or wireless means. The terminal 900 may access a wireless network based on a communication standard, such as WiFi, 2G or 3G, or a combination thereof. In one exemplary embodiment, the communication component 916 receives broadcast signals or broadcast-related information from an external broadcast management system via a broadcast channel. In one exemplary embodiment, the communication component 916 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth® (BT) technology, and other technologies.

In some exemplary embodiments, the terminal 900 may be implemented by at least one application-specific integrated circuit (ASIC), digital signal processor (DSP), digital signal processing device (DSPD), programmable logic device (PLD), field-programmable gate array (FPGA), controller, microcontroller, microprocessor, or other electronic component for performing any of the methods of FIGS. 1 to 5 above.

In some exemplary embodiments, there is further provided a non-transitory computer readable storage medium including instructions, such as the memory 904 including instructions, the instructions being executable by the processor 920 of the terminal 900 to accomplish any of the methods of FIGS. 1 to 5 above. For example, the non-transitory computer readable storage medium may be ROM, random access memory (RAM), CD-ROM, magnetic tape, floppy disk, and optical data storage devices, among others.

Figure 10:
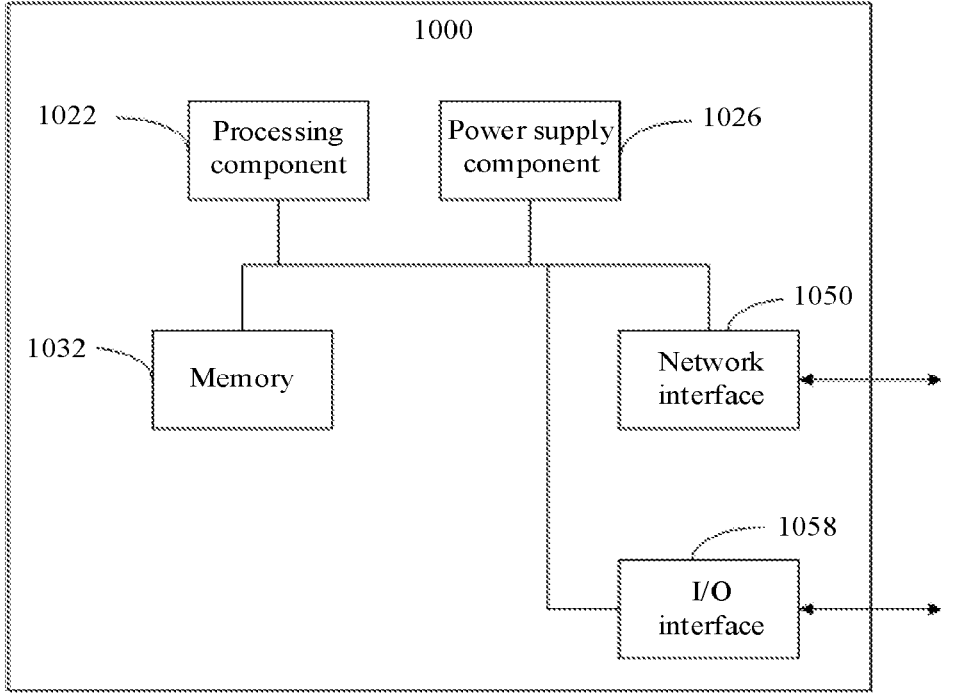
FIG. 10 is a schematic diagram of a structure of a network device provided by embodiments of the present disclosure.

FIG. 10 is a schematic diagram of a structure of a network device provided by embodiments of the present disclosure. Referring to FIG. 10, the network device 1000 includes a processing component 1022, which further includes at least one processor, and memory resources represented by memory 1032 for storing instructions, such as applications, that may be executed by the processing component 1022. The application programs stored in the memory 1032 may include one or more modules each corresponding to a set of instructions. In addition, the processing component 1022 is configured to execute the instructions to perform any of the methods applied to the network device as described above, for example, the method shown in FIG. 6.

The network device 1000 may also include a power supply component 1026 configured to perform power management of the network device 1000, a wired or wireless network interface 1050 configured to connect the network device 1000 to a network, and an input/output (I/O) interface 1058. The network device 1000 may perform operations based on an operating system stored in memory 1032, such as Windows Server™, Mac OS X™, Unix™, Linux™, FreeBSD™, or the like.

Other embodiments of this application will easily be anticipated by those skilled in the art upon consideration of the specification and practice of the application disclosed herein. The present disclosure is intended to cover any variation, use, or adaptation of the application that follows the general principles of the application and includes commonly known or customary technical means in the art that are not disclosed herein. The specification and embodiments are to be considered exemplary only, and the true scope and spirit of the present disclosure is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. A method for transmitting downlink control information, performed by a terminal, the method comprising:

receiving, through a first reception beam, first control information from a network device in a first time slot, and receiving, through a second reception beam, second control information from the network device in at least one second time slot; wherein the first reception beam and the second reception beam correspond to a same Transmission Reception Point (TRP) or different TRPs, and the first control information received in the first time slot and the second control information received in the at least one second time slot are first downlink control information of a plurality of repeated sendings by the network device; and decoding the first control information and/or the second control information to obtain the first downlink control information, wherein a time slot in at least one search space (SS) set that has an index value meeting a defined condition serves as the first time slot; and wherein the defined condition comprises at least one of:
the index value is an odd number or an even number;
the index value is an integer multiple of a first value; and
a remainder of the index value divided by a second value
matches a third value.

2. The method according to claim 1, wherein
the first time slot is configured for a first sending in the
plurality of repeated sendings; and
the at least one second time slot is configured for one or
more sendings after the first sending in the plurality of
repeated sendings.

3. The method according to claim 1, wherein the first time
slot belongs to a first Search Space (SS) set and the at least
one second time slot belongs to a second SS set.

4. The method according to claim 3, wherein a quantity of
the at least one second time slot is 1; and
the second time slot is a first one arrived after the first time
slot and corresponds to the second SS set.

5. The method according to claim 3, wherein
the first SS set is predetermined, or the first SS set is
configured by the network device.

6. The method according to claim 3, wherein
the first SS set and the second SS set are associated with
different control resource sets; or
the first SS set and the second SS set are associated with
a same control resource set.

7. The method according to claim 1, wherein the first
control information occupies a first frequency domain
resource of a first SS set, and the second control information
occupies a second frequency domain resource of a second
SS set; and
wherein the first frequency domain resource is among one
or more frequency domain resources corresponding to
the first SS set, and is configured for a first sending in
a plurality of repeated sendings; and
the second frequency domain resource is among one or
more frequency domain resources corresponding to the
second SS set, and is configured for one or more
sendings after the first sending in the plurality of
repeated sendings.

8. The method according to claim 7, wherein the first SS
set and the second SS set are different SS sets;
the one or more frequency domain resources correspond-
ing to the first SS set comprise a third frequency
domain resource; and
the third frequency domain resource is configured for one
or more sendings after a first sending of a plurality of
repeated sendings in the first time slot.

9. The method according to claim 7, wherein the first SS
set and the second SS set are different SS sets;
the one or more frequency domain resources correspond-
ing to the second SS set comprise a third frequency
domain resource; and
the third frequency domain resource is configured for a
first sending of a plurality of repeated sendings in the
second time slot.

10. The method according to claim 8, wherein
the third frequency domain resource, is configured for at
least one sending of the plurality of repeated sendings
of second downlink control information, the second
downlink control information being different from the
first downlink control information.

11. The method according to claim 7, wherein the first SS
set and the second SS set are different SS sets, and an
association exists between the first frequency domain
resource and the second frequency domain resource.

12. The method according to claim 11, wherein the
association comprises an association relationship between a
physical downlink control channel (PDCCH) candidate in
the first frequency domain resource and a PDCCH candidate
in the second frequency domain resource.

13. The method according to claim 1, wherein the second
time slot is after the first time slot and the method further
comprises:
merging the first control information and third control
information, and decoding the merged first control
information and the third control information; wherein
the third control information is sent by the network
device in a third time slot prior to the first time slot; and
merging, in response to a failure of the decoding of the
merged first control information and the third control
information, the first control information and the sec-
ond control information, and decoding the merged first
control information and the second control information.

14. A method for transmitting downlink control informa-
tion, performed by a network device, the method compris-
ing:
repeatedly sending first downlink control information to a
terminal;
wherein the first downlink control information of a plu-
rality of repeated sendings comprises first control infor-
mation and second control information, the first control
information is received by the terminal using a first
reception beam in a first time slot, and the second
control information is received by the terminal using a
second reception beam in at least one second time slot;
and the first reception beam and the second reception
beam correspond to a same Transmission Reception
Point (TRP) or different TRPs; and the first control
information and/or the second control information is
configured for decoding by the terminal to obtain the
first downlink control information,
wherein a time slot in at least one search space (SS) set
that has an index value meeting a defined condition
serves as the first time slot; and
wherein the defined condition comprises at least one of:
the index value is an odd number or an even number;
the index value is an integer multiple of a first value; and
a remainder of the index value divided by a second value
matches a third value.

15. A non-transitory computer storage medium having
computer-executable instructions stored thereon, wherein
the computer-executable instructions, when executed by a
processor, cause the processor to implement the method
according to claim 1.

16. The method according to claim 14, wherein
the first time slot is configured for a first sending in the
plurality of repeated sendings; and
the at least one second time slot is configured for one or
more sendings after the first sending in the plurality of
repeated sendings.

17. The method according to claim 16, wherein the first
time slot belongs to a first Search Space (SS) set and the at
least one second time slot belongs to a second SS set.

18. The method according to claim 17, wherein a quantity
of the at least one second time slot is 1, and the second time
slot is a first one arrived after the first time slot and
corresponds to the second SS set.

19. A communication device, comprising:
a transceiver;
a memory; and
a processor connected to the transceiver and the memory,
respectively, and configured to control a transmission and reception by the transceiver of a wireless signal by executing computer-executable instructions on the memory to:

receive, through a first reception beam, first control information from a network device in a first time slot, and receive, through a second reception beam, second control information from the network device in at least one second time slot; wherein the first reception beam and the second reception beam correspond to a same Transmission Reception Point (TRP) or different TRPs, and the first control information received in the first time slot and the second control information received in the at least one second time slot are first downlink control information of a plurality of repeated sendings by the network device; and decode the first control information and/or the second control information to obtain the first downlink control information, wherein a time slot in at least one search space (SS) set that has an index value meeting a defined condition serves as the first time slot; and wherein the defined condition comprises at least one of:

the index value is an odd number or an even number;

the index value is an integer multiple of a first value; and a remainder of the index value divided by a second value matches a third value.

* * * * *